United States Patent
Oh et al.

(10) Patent No.: US 11,441,619 B2
(45) Date of Patent: Sep. 13, 2022

(54) CLUTCH AND COMPRESSOR INCLUDING SAME

(71) Applicant: Hanon Systems, Daejeon (KR)

(72) Inventors: Sung Taeg Oh, Daejeon (KR); Min Hwan Kim, Daejeon (KR); Jung Ki Kim, Daejeon (KR)

(73) Assignee: Hanon Systems, Daejeon (KR)

( * ) Notice: Subject to any disclaimer, the term of this patent is extended or adjusted under 35 U.S.C. 154(b) by 411 days.

(21) Appl. No.: 16/614,835

(22) PCT Filed: Jun. 20, 2018

(86) PCT No.: PCT/KR2018/006959
§ 371 (c)(1),
(2) Date: Nov. 19, 2019

(87) PCT Pub. No.: WO2019/004647
PCT Pub. Date: Jan. 3, 2019

(65) Prior Publication Data
US 2020/0198442 A1 Jun. 25, 2020

(30) Foreign Application Priority Data

Jun. 28, 2017 (KR) .................... 10-2017-0081606
May 14, 2018 (KR) .................... 10-2018-0054739

(51) Int. Cl.
*F16D 27/112* (2006.01)
*B60H 1/32* (2006.01)
(Continued)

(52) U.S. Cl.
CPC ......... *F16D 27/112* (2013.01); *B60H 1/3222* (2013.01); *B60H 2001/325* (2013.01);
(Continued)

(58) Field of Classification Search
CPC ............. F16H 27/112; F16H 2027/007; F16H 2300/002; B60H 1/3222
See application file for complete search history.

(56) References Cited

U.S. PATENT DOCUMENTS 4,243,128 A 1/1981 Shirai
4,574,930 A 3/1986 Koitabashi
(Continued)

FOREIGN PATENT DOCUMENTS

EP 1486694 A2 12/2004
JP H07-020429 U 4/1995
(Continued)

OTHER PUBLICATIONS

International Search Report issued in PCT/KR2018/006959 dated Nov. 28, 2018.

*Primary Examiner* — David R Morris
(74) *Attorney, Agent, or Firm* — Norton Rose Fulbright US LLP; James R. Crawford

(57) ABSTRACT

A clutch and a compressor including the same, and may include a hub fastened to a rotary shaft of a compressor and rotatable with the rotary shaft in a state where its position has been fixed, a disk fastened to the hub and rotatable with the hub, a pulley rotated by receiving power from a driving source of the compressor, an elastic member fastening the hub and the disk, fastening the hub and the disk so that the disk approaches or is away from the pulley based on the hub, a field coil assembly magnetized when power is applied to contact or space the disk and the pulley, an attenuation member interposed between the elastic member and the disk, thereby reducing the noise and vibration due to the contact and spacing between the disk and the pulley by the elastic member and the attenuation member.

21 Claims, 20 Drawing Sheets

(51) Int. Cl.
*F04B 27/08* (2006.01)
*F16D 27/14* (2006.01)
*F16D 27/00* (2006.01)
*F16H 55/36* (2006.01)

(52) U.S. Cl.
CPC .......... *F04B 27/0895* (2013.01); *F16D 27/14* (2013.01); *F16D 2027/001* (2013.01); *F16D 2027/007* (2013.01); *F16D 2300/22* (2013.01); *F16H 55/36* (2013.01)

(56) References Cited

U.S. PATENT DOCUMENTS

| | | | |
|---|---|---|---|
| 5,445,256 A * | 8/1995 | Tabuchi | F16D 27/112 192/84.96 |
| 6,209,699 B1 | 4/2001 | Hayashi et al. | |
| 6,823,974 B2 * | 11/2004 | Hayashi | F16D 27/14 192/209 |
| 7,017,726 B2 * | 3/2006 | Konishi | F16D 27/112 192/84.961 |
| 10,036,431 B2 * | 7/2018 | Fujisawa | F16D 27/02 |
| 2003/0159901 A1 * | 8/2003 | Hayashi | F16D 27/112 192/209 |
| 2004/0016617 A1 | 1/2004 | Imai et al. | |
| 2004/0188217 A1 * | 9/2004 | Konishi | F16D 27/112 192/84.961 |
| 2017/0067516 A1 * | 3/2017 | Fujisawa | F16D 27/112 |

FOREIGN PATENT DOCUMENTS

| | | |
|---|---|---|
| JP | H1054426 A | 2/1998 |
| JP | H10115332 A | 5/1998 |
| JP | H11325120 A | 11/1999 |
| JP | 2003247565 A | 9/2003 |
| JP | 2016223600 A | 12/2016 |
| JP | 2017053486 A | 3/2017 |
| KR | 200306772 Y1 | 3/2003 |
| KR | 20040034191 A | 4/2004 |
| KR | 100560612 B1 | 3/2006 |
| KR | 101339809 B1 | 12/2013 |
| WO | 2017170431 A1 | 10/2017 |

* cited by examiner

CLUTCH AND COMPRESSOR INCLUDING SAME

This application is a national phase under 35 U.S.C. § 371 of International Application No. PCT/KR2018/006959 filed Jun. 20, 2018, which claims the benefit of priority from Korean Patent Application Nos. 10-2017-0081606 filed on Jun. 28, 2017, and 10-2018-0054729, filed on May 14, 2018. The entire contents of each of these applications is incorporated herein by reference in its entirety.

TECHNICAL FIELD

The present disclosure relates to a clutch and a compressor including the same, and more particularly, to a clutch and a compressor including the same, which may be magnetized and demagnetized, and selectively connect and disconnect a driving source and a rotary shaft.

BACKGROUND ART

Generally, a vehicle is installed with an air conditioner (A/C) for cooling and heating the indoor. Such an air conditioner is a configuration of a cooling and heating system, and includes a compressor for compressing low-temperature and high-pressure gaseous refrigerant received from an evaporator into high-temperature and high-pressure gaseous refrigerant to send it to a condenser.

The compressor includes a reciprocating type that compresses the refrigerant according to the reciprocating motion of a piston and a rotary type that compresses while performing the rotary motion. The reciprocating type includes a crank type that uses a crank according to a transfer method of a driving source to transfer it to a plurality of pistons, a swash plate type that transfers a rotary shaft installed with a swash plate, etc., and the rotary type includes a vane rotary type that uses a rotary shaft and a vane, and a scroll type that uses a orbiting scroll and a fixed scroll.

Such a compressor typically includes a rotary shaft for transferring a rotational force to a compression mechanism for compressing refrigerant, and is configured to include a clutch for selectively connecting and disconnecting the driving source (e.g., engine) and rotary shaft of the compressor to selectively receive power from the driving source to be operated.

Specifically, the compressor includes a casing, a compression mechanism provided inside the casing and for compressing refrigerant, a rotary shaft for transferring a rotational force from the driving source (e.g., engine) provided outside the casing to the compression mechanism, and a clutch for selectively connecting and disconnecting the driving source and the rotary shaft.

Referring to Korean Patent No. 10-1339809, the clutch includes a hub fastened to a rotary shaft and rotatable with the rotary shaft, a disk fastened to the hub and rotatable with the hub, a pulley rotated by receiving power from the driving source, an elastic member for fastening the hub and the disk and applying an elastic force to the disk in the direction where the disk is away from the pulley while fastening the hub and the disk so as to be movable in the direction where the disk approaches or is away from the pulley based on the hub, and a field coil assembly that is magnetized when power is applied to move the disk to the pulley side to contact the disk and the pulley.

Here, the hub, the elastic member, and the disk form a so-called disk hub assembly.

The compressor according to this configuration operates as follows.

That is, the pulley is rotated by receiving a driving force from the driving source.

In this state, when power is applied to the field coil assembly, the disk is moved to the pulley side by the attractive force by the magnetic induction of the field coil assembly to contact the pulley. That is, the disk and the pulley are coupled, such that the power of the driving source is transferred to the rotary shaft through the pulley, the disk, the elastic member, and the hub. Further, the rotary shaft operates the compression mechanism with the received power to compress the refrigerant.

On the other hand, when the power applied to the field coil assembly is interrupted, the attractive force due to the magnetic induction of the field coil assembly is not generated at all, and the disk is moved in a direction away from the pulley by the elastic member to be spaced apart from the pulley. That is, the power transfer from the driving source to the rotary shaft is interrupted. Further, an operation of the compression mechanism is interrupted, and the refrigerant compression is interrupted.

However, in the conventional clutch and the compressor including the same, there is a problem in that the noise and vibration due to the contact and spacing between the pulley and the disk is not attenuated. That is, there has been a problem in that when the pulley and the disk collide, a considerable noise and vibration are generated, and the noise and vibration generated when the pulley and the disk are rotated together in a state where the pulley and the disk has been contacted are transferred to the compressor, and considerable noise and vibration are generated due to the repulsive force of the disk when the pulley and the disk are spaced apart from each other.

DISCLOSURE

Technical Problem

Accordingly, an object of the present disclosure is to provide a clutch capable of reducing the noise and vibration due to contact and spacing between a pulley and a disk, and a compressor including the same.

Technical Solution

For achieving the object, the present disclosure provides a clutch including a hub fastened to a rotary shaft of a compressor and rotatable with the rotary shaft in a state where its position has been fixed; a disk fastened to the hub and rotatable with the hub; a pulley rotated by receiving power from a driving source of the compressor; an elastic member fastening the hub and the disk, and fastening the hub and the disk so that the disk approaches or is away from the pulley based on the hub; a field coil assembly magnetized when power is applied to contact or space the disk and the pulley; and an attenuation member interposed between the elastic member and the disk, and the elastic member and the attenuation member are formed to reduce the noise and vibration transferred from the disk to the elastic member while reducing the noise and vibration due to the contact and spacing between the disk and the pulley.

The attenuation member may include a first attenuation member contacting the disk and the elastic member during a contact period and a spacing period between the disk and the pulley.

The elastic member may includes a first annular part fastened to the hub; a second annular part formed of an annular shape receiving the first annular part, and fastened to the disk; and a protrusion part protruded from the first annular part to the second annular part side, and the first attenuation member may be interposed between the protrusion part and the disk.

The first annular part may include n first fastening parts disposed at regular intervals along the rotational direction and fastened to the hub, respectively; and n first intermediate parts interposed between the n first fastening parts, and the second annular part may include n second fastening parts disposed at regular intervals along the rotational direction and fastened to the disk, respectively; and n second intermediate parts interposed between the n second fastening parts, n protrusion parts may be formed, each of the first intermediate parts may be formed to overlap each of the second intermediate parts in the rotational radius direction, each of the first fastening parts may be formed to overlap each of the second fastening parts in the rotational radius direction, and each of the protrusion parts may be formed to be protruded in the rotational radius direction from each of the first intermediate parts to a position facing the inner circumferential portion of the disk.

The protrusion part and the first attenuation member may be formed so that the first attenuation member is squeezed between the protrusion part and the disk.

The first attenuation member may be fixed to the protrusion part, and the protrusion part may be formed to press the first attenuation member to the disk side.

The first attenuation member may be fixed to the disk, and the protrusion part may be formed to press the first attenuation member.

When the thickness of the first attenuation member in a state where the first attenuation member has been detached from the protrusion part and the disk is referred to as a first dimension, an interval between the protrusion part and the disk in a state where the first attenuation member has been detached from the protrusion part and the disk and the disk has been spaced apart from the pulley is referred to as a second dimension, and an interval between the protrusion part and the disk in a state where the first attenuation member has been detached from the protrusion part and the disk and the disk has contacted the pulley, the first dimension may be formed to be larger than the second dimension and the third dimension.

The protrusion part may be formed to be disposed on the same plane as the first annular part when no external force is applied to the protrusion part.

The protrusion part may be deformed to the opposite side of the disk, when the first attenuation member is interposed between the protrusion part and the disk and the disk is spaced apart from the pulley, and may be restored to the plane side, when the first attenuation member is interposed between the protrusion part and the disk and the disk contacts the pulley.

The protrusion part may be formed to be bent to the disk side based on the plane where the first annular part is disposed when no external force is applied to the protrusion part.

The protrusion part may be deformed in the direction where the bending amount is reduced, when the first attenuation member is interposed between the protrusion part and the disk and the disk is spaced apart from the pulley, and may be restored in the direction where the bending amount is increased, when the first attenuation member is interposed between the protrusion part and the disk and the disk contacts the pulley.

The protrusion part may be formed with a rigidity adjusting hole penetrating the protrusion part in order to adjust the rigidity of the protrusion part.

The attenuation member may further include a second attenuation member contacting the disk and the elastic member during a spacing period between the disk and the pulley, and spaced apart from one of the disk and the elastic member during a contact period between the disk and the pulley, and the second attenuation member may be formed to space a contact surface between the elastic member and the disk during the spacing period between the disk and the pulley from a position such as a contact surface between the elastic member and the hub to the pulley side.

The elastic member may include a first annular part fastened to the hub; a second annular part formed of an annular shape receiving the first annular part, and fastened to the disk; and a bridge part for connecting the first annular part with the second annular part, and the second attenuation member may be interposed between at least one of the bridge part and the second annular part and the disk.

The first annular part may include n first fastening parts disposed at regular intervals along the rotational direction and fastened to the hub, respectively; and n first intermediate parts interposed between the n first fastening parts, and the second annular part may include n second fastening parts disposed at regular intervals along the rotational direction and fastened to the disk, respectively; and n second intermediate parts interposed between the n second fastening parts, n bridge parts may be formed, each of the first intermediate parts may be formed to overlap each of the second intermediate parts in the rotational radius direction, each of the first fastening parts may be formed to overlap each of the second fastening parts in the rotational radius direction, each of the bridge parts may be formed to be extended in the rotational radius direction from each of the first fastening parts to each of the second intermediate parts, and the second attenuation member may be interposed between at least one of the bridge part and the second intermediate part and the disk.

The first attenuation member and the second attenuation member may be integrally formed.

Further, the present disclosure provides a clutch further including a hub fastened to a rotary shaft of a compressor and rotatable with the rotary shaft in a state where its position has been fixed; a disk fastened to the hub and rotatable with the hub; a pulley rotated by receiving power from a driving source of the compressor; an elastic member fastening the hub and the disk, and fastening the hub and the disk so that the disk approaches or is away from the pulley based on the hub; a field coil assembly magnetized when power is applied to contact or space the disk and the pulley; and an attenuation member interposed between the elastic member and the disk, and the attenuation member may include a first attenuation member contacting the disk and the elastic member during a contact period and a spacing period between the disk and the pulley; a second attenuation member contacting the disk and the elastic member during the spacing period between the disk and the pulley; and a blind for covering the spacing space between the hub and the disk, and at least a portion of a slot of the disk.

The blind may be formed integrally with at least one of the first attenuation member and the second attenuation member.

Further, the present disclosure includes a casing; a compression mechanism provided inside the casing and for compressing refrigerant; a rotary shaft for transferring a rotational force from a driving source provided outside the casing to the compression mechanism; and a power transfer mechanism for selectively connecting and disconnecting the driving source and the rotary shaft, and the power transfer mechanism may be formed of the clutch.

Advantageous Effects

A clutch and a compressor including the same according to the present disclosure include a hub fastened to the rotary shaft of a compressor and rotatable with the rotary shaft in a state where its position has been fixed; a disk fastened to the hub and rotatable with the hub; a disk fastened to the hub and rotatable with the hub; a pulley rotated by receiving power from a driving source of the compressor; an elastic member for fastening the hub and the disk, and fastening the hub and the disk so as to be movable in the direction where the disk approaches or is away from the pulley based on the hub; a field coil assembly magnetized when power is applied to contact the disk and the pulley or be spaced apart from each other; and an attenuation member interposed between the elastic member and the disk, and it is possible to reduce the noise and vibration due to the contact and spacing between the disk and the pulley by the elastic member and the attenuation member.

BEST MODE

Hereinafter, a clutch and a compressor including the same according to the present disclosure will be described in detail with reference to the accompanying drawings.

Figure 1:
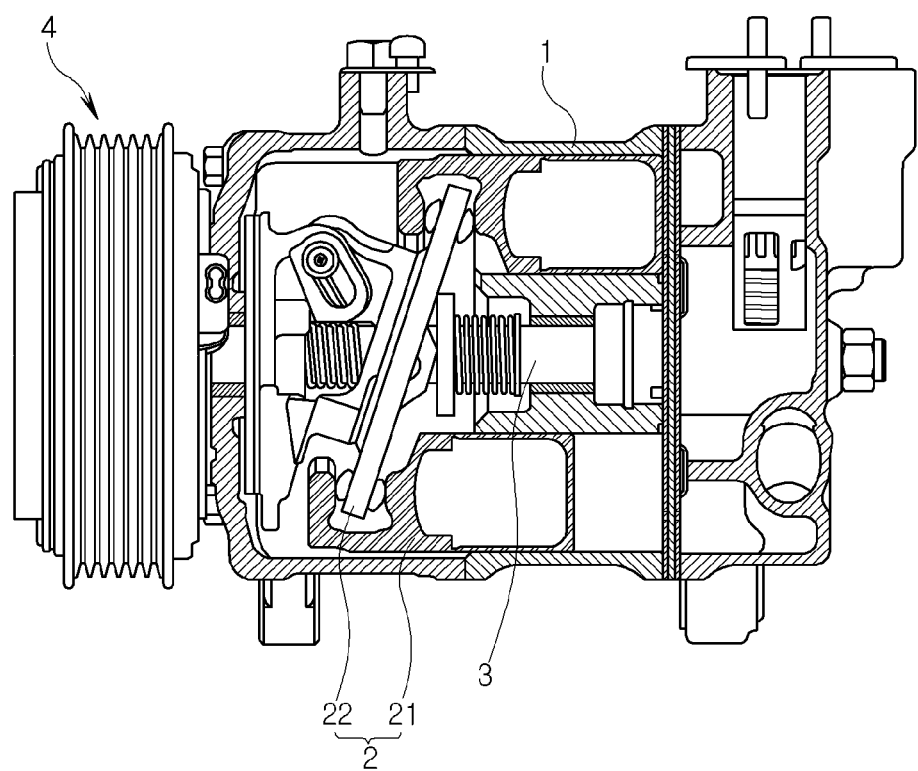
FIG. 1 is a cross-sectional diagram showing a compressor including a clutch.
Figure 2:
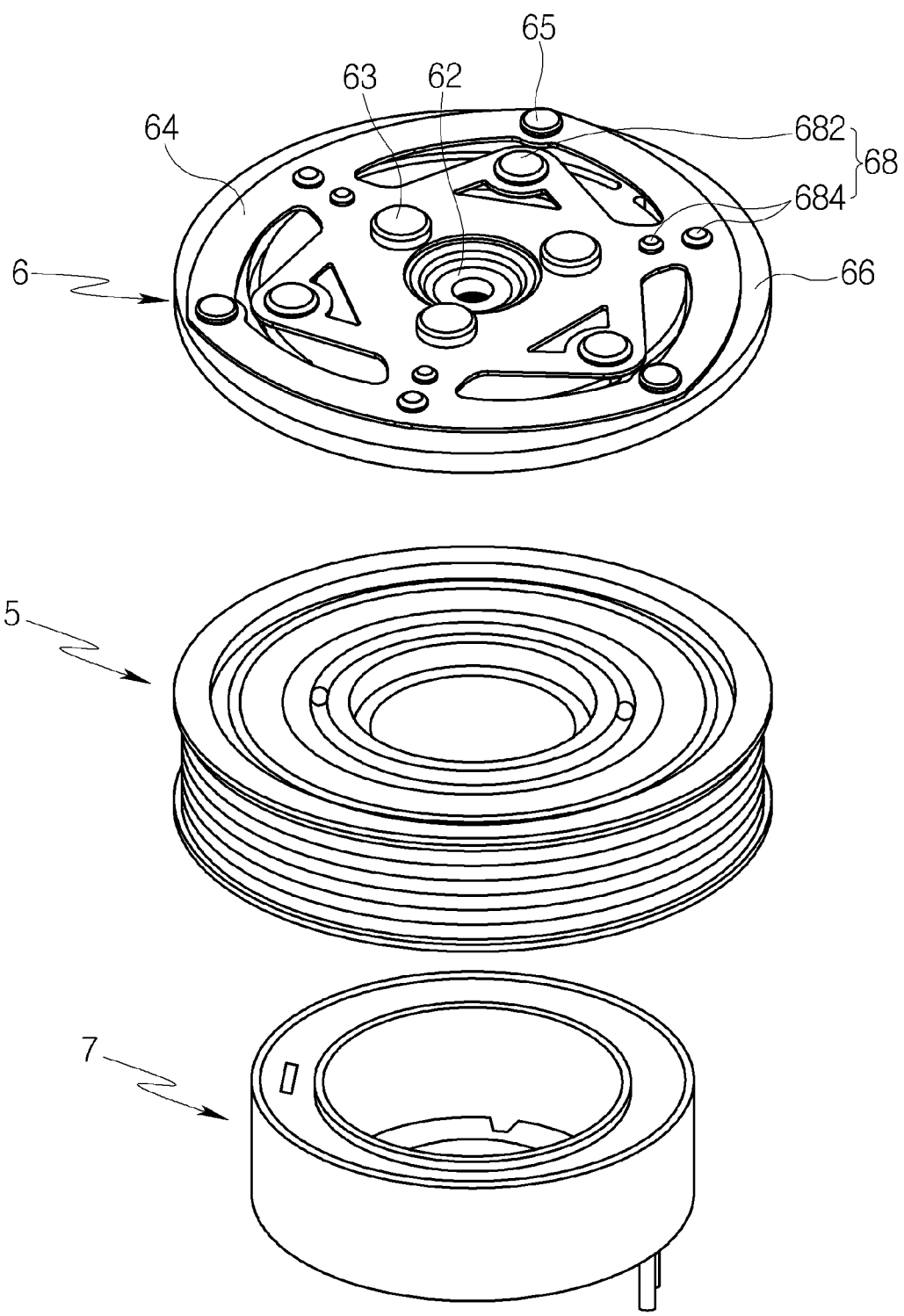
FIG. 2 is an exploded perspective diagram showing a clutch according to an embodiment of the present disclosure.
Figure 3:
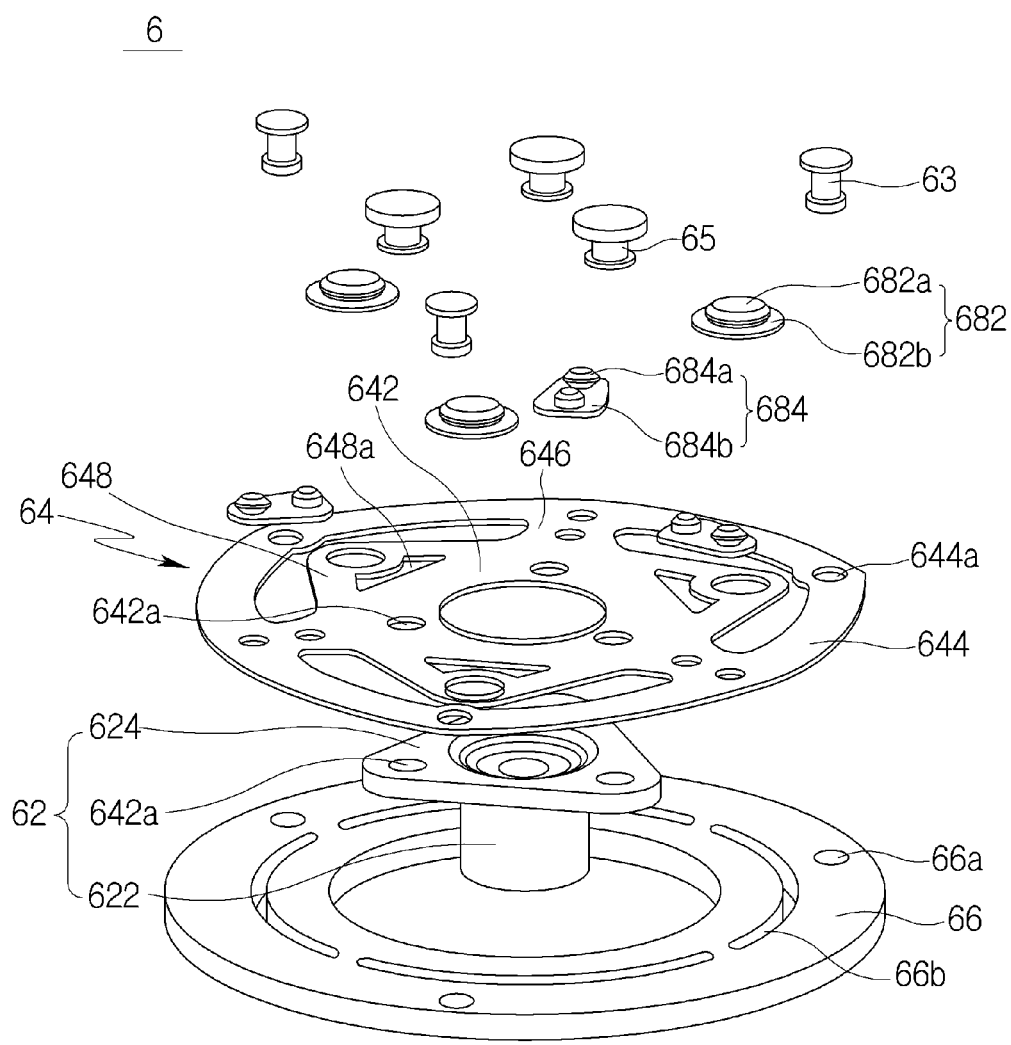
FIG. 3 is an exploded perspective diagram showing a disk hub assembly of FIG. 2.
Figure 4:
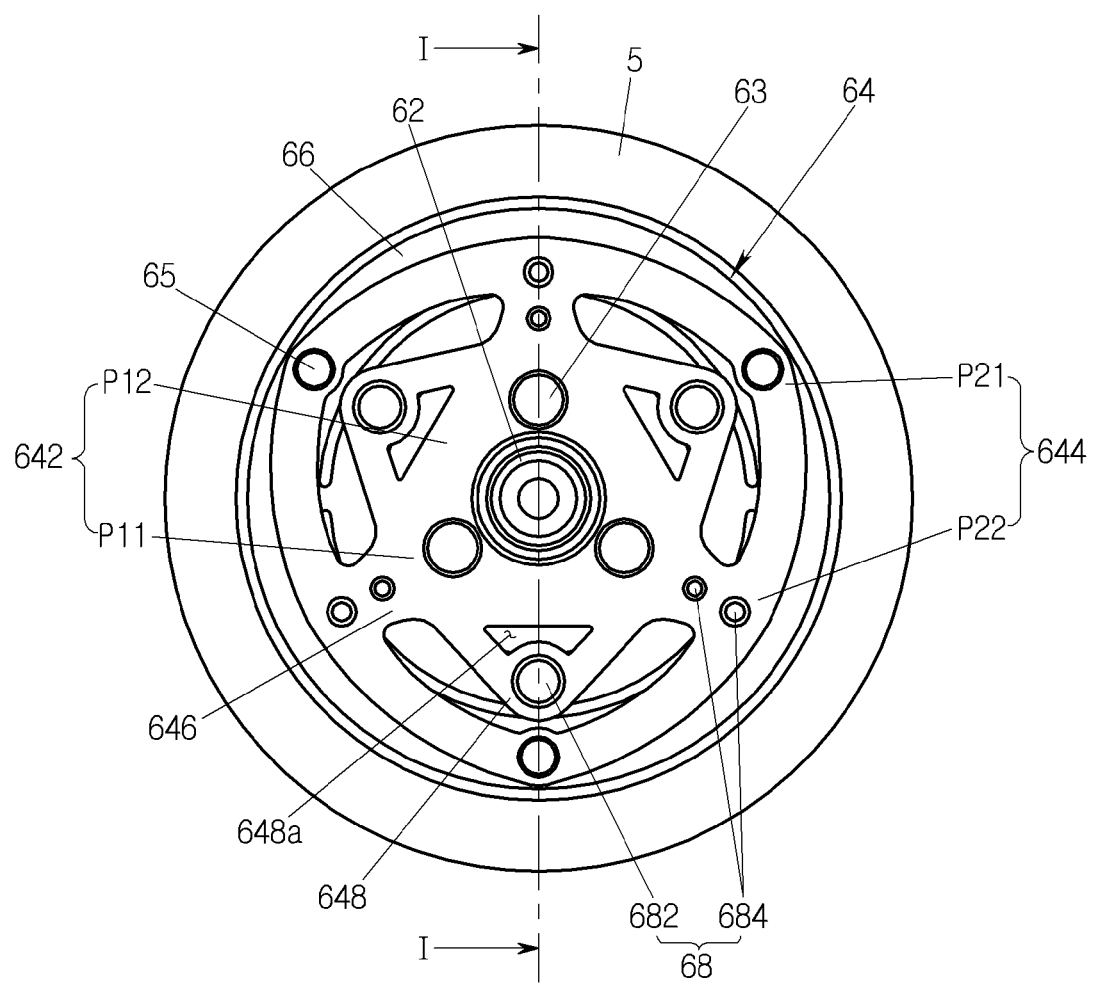
FIG. 4 is a plane diagram showing a state where the clutch of FIG. 2 has been assembled.
Figure 5:
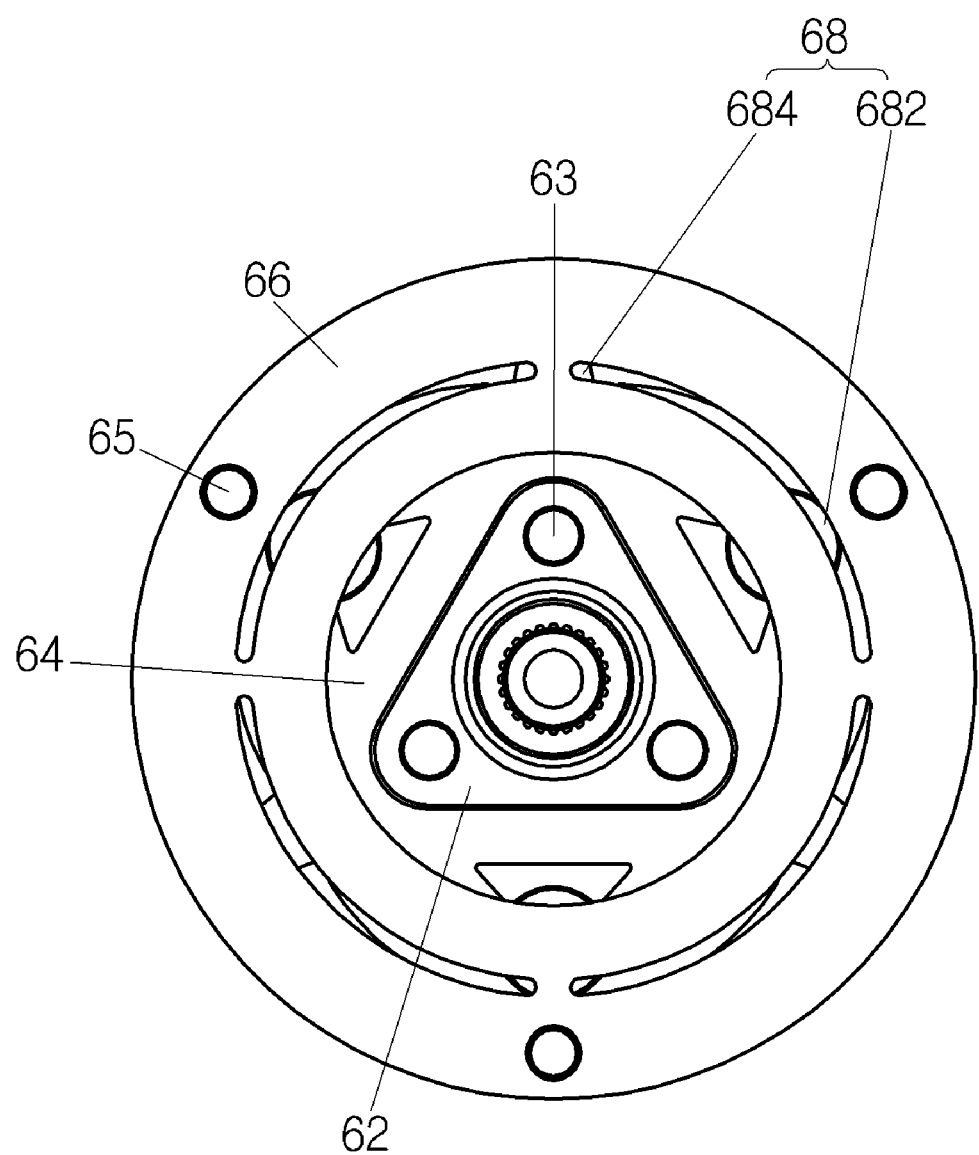
FIG. 5 is a lower surface diagram of FIG. 4 in a state where a pulley has been detached.
Figure 6:
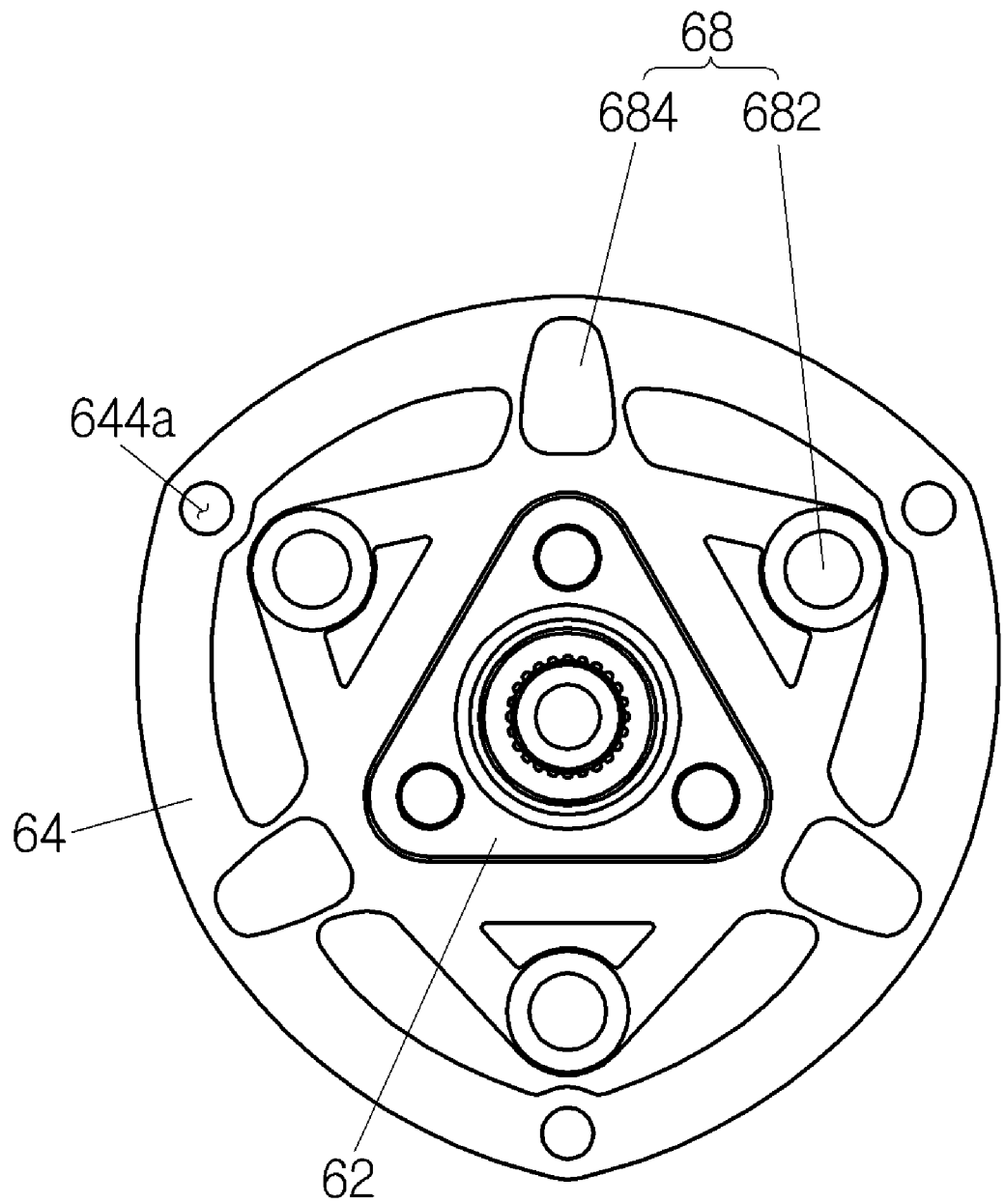
FIG. 6 is a lower surface diagram of FIG. 4 in a state where the pulley and the disk have been detached.
Figure 7:
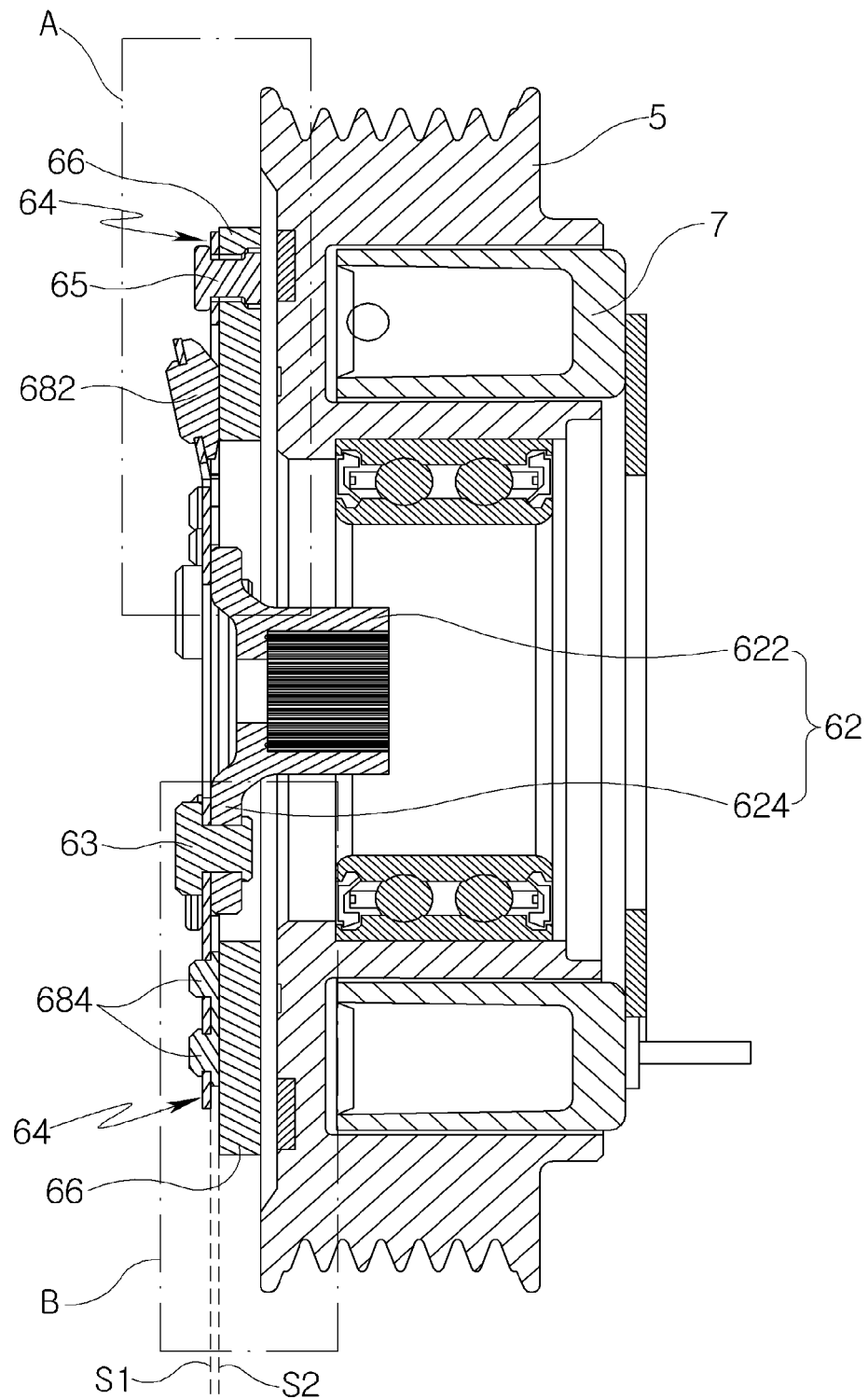
FIG. 7 is a cross-sectional diagram of the line I-I of FIG. 4.
Figure 8:
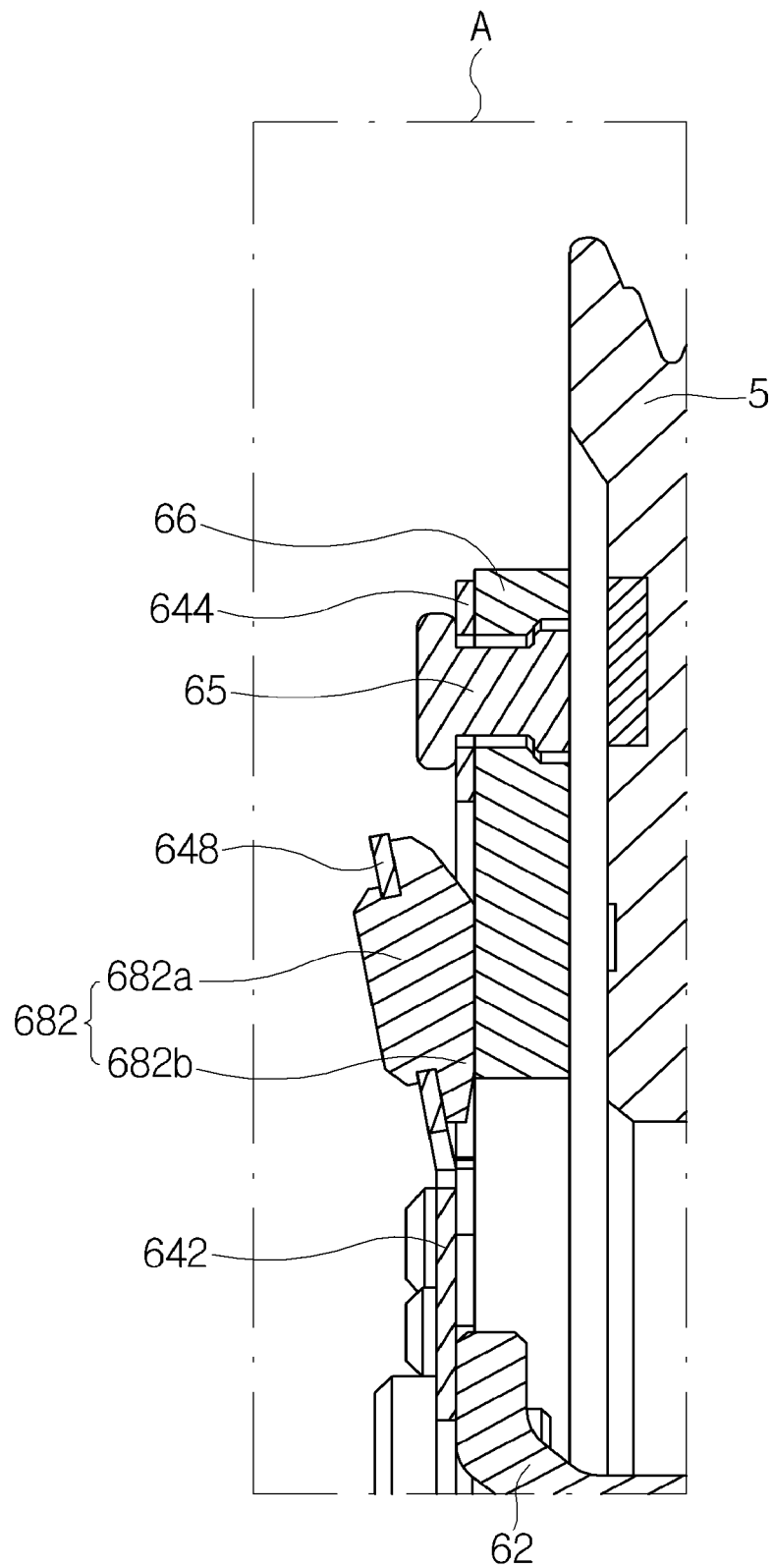
FIG. 8 is an enlarged diagram of a portion A of FIG. 7 in a state where the disk and the pulley have been spaced apart from each other.
Figure 9:
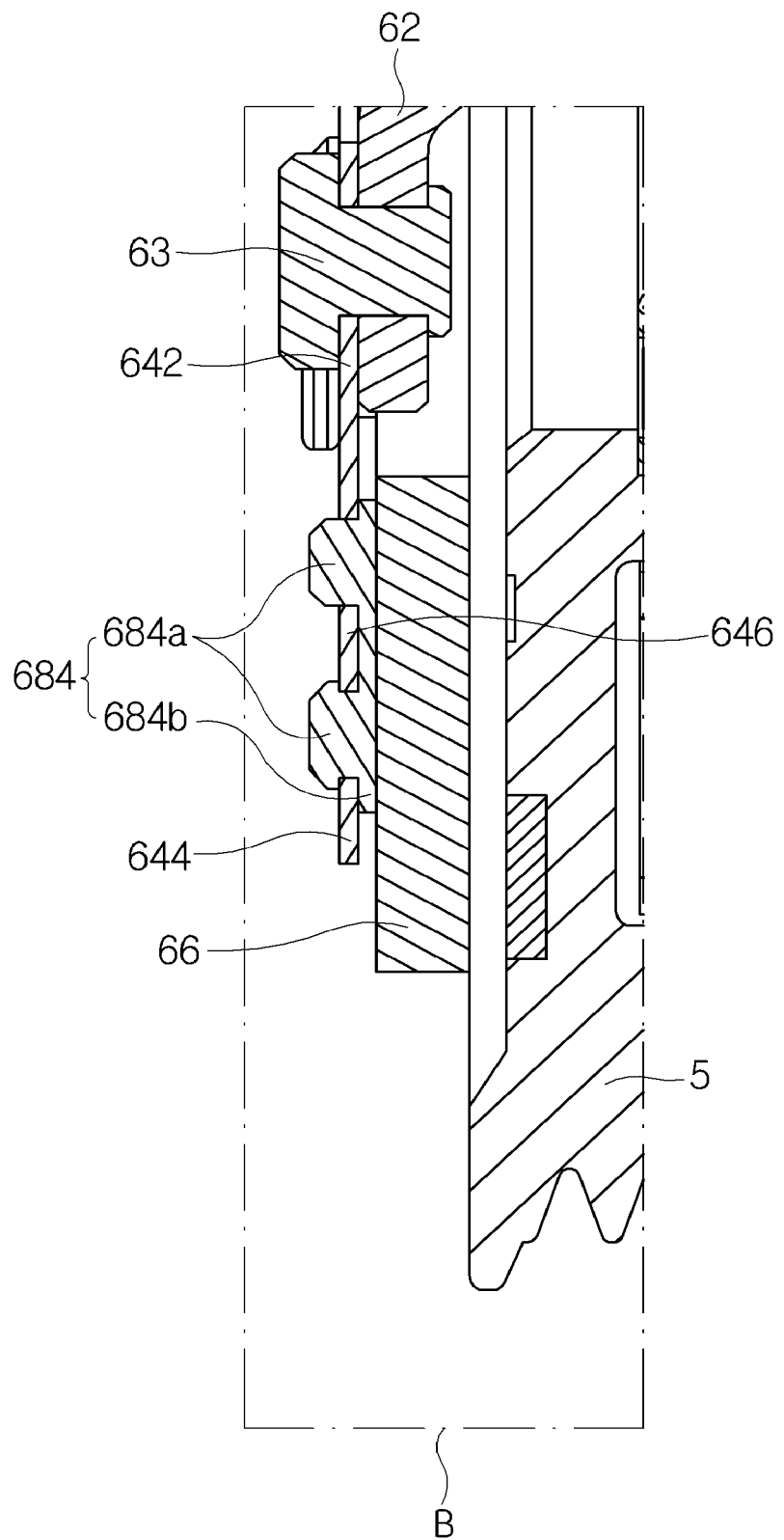
FIG. 9 is an enlarged diagram of a portion B of FIG. 7 in a state where the disk and the pulley have been spaced apart from each other.
Figure 10:
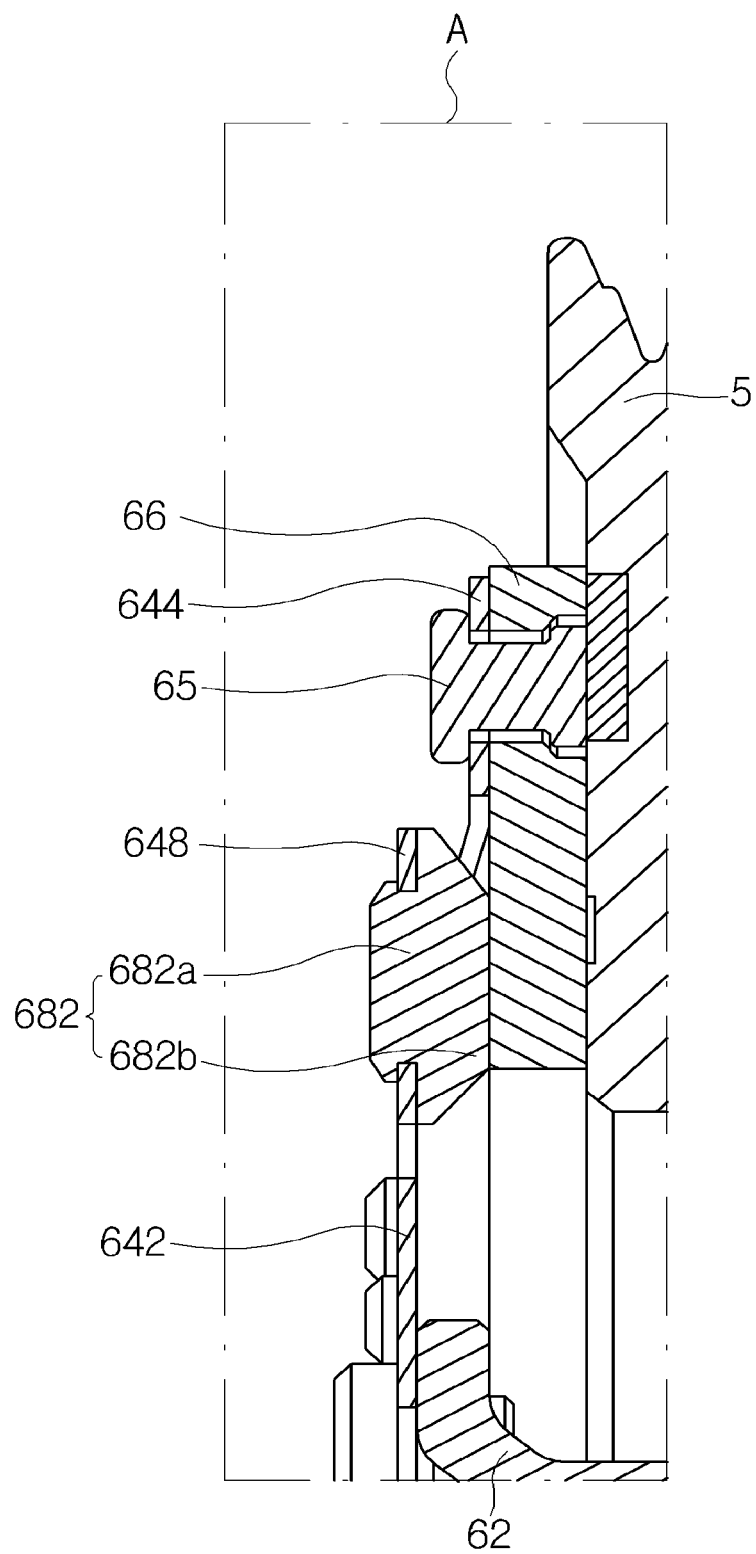
FIG. 10 is an enlarged diagram of a portion A of FIG. 7 in a state where the disk and the pulley have been contacted.
Figure 11:
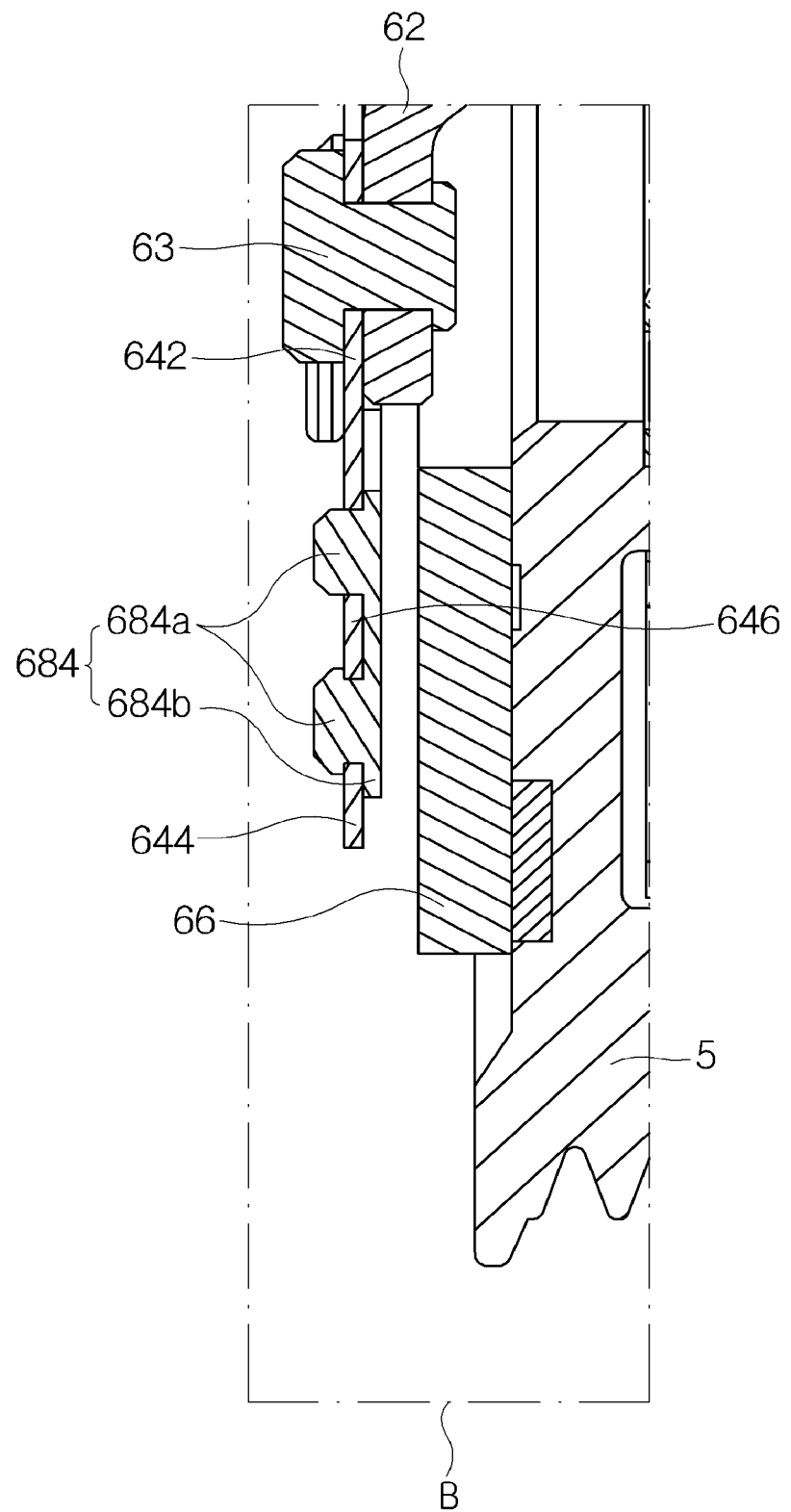
FIG. 11 is an enlarged diagram of a portion B of FIG. 7 in a state where the disk and the pulley have been contacted.

FIG. 1 is a cross-sectional diagram showing a compressor including a clutch, FIG. 2 is an exploded perspective diagram showing a clutch according to an embodiment of the present disclosure, FIG. 3 is an exploded perspective diagram showing a disk hub assembly of FIG. 2, FIG. 4 is a plane diagram showing a state where the clutch of FIG. 2 has been assembled, FIG. 5 is a lower surface diagram of FIG. 4 in a state where a pulley has been detached, FIG. 6 is a lower surface diagram of FIG. 4 in a state where the pulley and the disk have been detached, FIG. 7 is a cross-sectional diagram of the line I-I of FIG. 4, FIG. 8 is an enlarged diagram of a portion A of FIG. 7 in a state where the disk and the pulley have been spaced apart from each other, FIG. 9 is an enlarged diagram of a portion B of FIG. 7 in a state where the disk and the pulley have been spaced apart from each other, FIG. 10 is an enlarged diagram of a portion A of FIG. 7 in a state where the disk and the pulley have been contacted, and FIG. 11 is an enlarged diagram of a portion B of FIG. 7 in a state where the disk and the pulley have been contacted.

Referring to FIG. 1, a compressor according to an embodiment of the present disclosure may include a casing 1, a compression mechanism 2 provided inside the casing 1 and for compressing refrigerant, a rotary shaft 3 for transferring a rotational force from a driving source (not shown) (e.g., engine) provided outside the casing 1, and a power transfer mechanism for selectively connecting and disconnecting the driving source (not shown) and the rotary shaft 3.

The compression mechanism 2 may include a piston 21 provided to be reciprocable inside a bore of the casing 1, and a swash plate 22 fastened to the rotary shaft 3 to be rotated with the rotary shaft 3 and for reciprocating the piston 21. Here, the compression mechanism 2 is formed in a swash plate 22 method including the piston 21 and the swash plate 22 in the present embodiment, but may be formed in various methods such as a scroll method including an orbiting scroll pivoted by receiving the rotational force of the rotary shaft 3 and a fixed scroll engaged with the orbiting scroll.

The rotary shaft 3 may have one end portion connected to the compression mechanism 2, and the other end portion protruded to the outside of the casing 1 through the casing 1, and may be fastened to a disk hub assembly 6.

The power transfer mechanism may be formed of an electronic clutch (hereinafter referred to as a clutch) 4 that is magnetized when power is applied to connect the driving source (not shown) and the rotary shaft 3 and is demagnetized when the power is interrupted to disconnect the driving source (not shown) and the rotary shaft 3.

Referring to FIGS. 2 to 11, the clutch 4 may include a pulley 5 rotated by receiving power from the driving source (not shown), the disk hub assembly 6 fastened to the rotary shaft 3 and selectively contacting and separating the pulley 5, and the field coil assembly 7 magnetized when power is applied to contact the pulley 5 with the disk hub assembly 6.

The pulley 5 is formed in a substantially annular shape, and the outer circumferential surface of the pulley 5 is hoisted with a driving belt (not shown) for transferring a driving force from the driving source to the pulley, and a bearing for rotatably supporting the pulley 5 may be interposed between the inner circumferential surface of the pulley 5 and the outer surface of the casing 1.

Further, a friction surface capable of contacting a disk 66, which will be described later, of the disk hub assembly 6 is formed on one side surface of the pulley 5, and a field coil assembly receiving groove into which the field coil assembly 7 is inserted and mounted may be formed on the other side surface of the pulley 5.

The disk hub assembly 6 may include a hub 62 fastened to the rotary shaft 3 to be rotatable with the rotary shaft 3 in a state where its position has been fixed, a disk 66 fastened to the hub 62 to be rotatable with the hub 62 and for selectively contacting and separating the pulley 5, and an elastic member 64 for fastening the hub 62 and the disk 66.

Here, the elastic member 64 may be fastened to the hub 62 by a first fastening member 63 such as a rivet, for example, at one side thereof, and fastened to the disk 66 by a second fastening member 65 such as a rivet, for example, at the other side thereof to fasten the hub 62 and the disk 66.

The hub 62 may include a boss part 622 into which the rotary shaft 3 is inserted and a flange part 624 extending from the boss part 622.

The flange part 624 may be formed with a hub side fastening hole 624a into which the first fastening member 63 is inserted, the hub side fastening hole 624a may be formed by three, and the side fastening holes 624a may be arranged at regular intervals along the rotational direction.

Here, the first fastening member 63, the second fastening member 65, the hub side fastening hole 624a, a disk side fastening hole 66a described later, a first annular part side fastening hole 642a, a second annular part side fastening hole 644a described later, a first fastening part P11 described later, a second fastening part P21 described later, a bridge part 646 described later, a protrusion part 648 described later, a first attenuation member 682 described later, and a second attenuation member 684 described later are formed by three, respectively, but the number thereof may be appropriately adjusted.

The disk 66 may be formed in an annular shape that receives the hub 62.

Further, the disk 66 is formed with the disk side fastening hole 66a into which the second fastening member 65 is inserted, the disk side fastening hole 66a is formed by three, and the three disk side fastening holes 66a may be arranged at regular intervals along the rotational direction.

The elastic member 64 may support the disk 66 to be movable in the direction where it approaches or is away from the pulley 5 based on the hub 62 coupled with the rotary shaft 3 to be fixed in position.

Further, the elastic member 64 may be formed to apply an elastic force to the disk 66 in the direction where the disk 66 is away from the pulley 5 so as to separate the disk 66 and the pulley 5 when power to the field coil assembly 7 is interrupted.

Here, the disk hub assembly 6 according to the present embodiment further includes an attenuation member 68 for attenuating the noise and vibration due to contact and spacing between the disk 66 and the pulley 5, and the elastic member 64 and the attenuation member 68 may be formed in a predetermined shape.

Specifically, when the pulley 5 and the disk 66 contact each other, the noise and vibration due to the collision between the pulley 5 and the disk 66 are generated, and the noise and vibration due to collision may be transferred to the compressor through the disk 66, the elastic member 64, and the hub 62. Further, while the pulley 5 and the disk 66 contact each other to rotate together, the noise and vibration due to the driving of the pulley 5 may be transferred to the compressor through the disk 66, the elastic member 64, and the hub 62. Further, when the disk 66 is spaced apart from the pulley 5 in a state where it has contacted the pulley 5, the noise and vibration due to the collision between the disk 66 and the elastic member 64 may be generated. The noise and vibration due to the contact and spacing between the disk 66 and the pulley 5 may not only cause discomfort to the user, but also adversely affect the behavior of the compressor.

Considering the above, the present embodiment further includes the attenuation member 68 for attenuating the noise and vibration due to contact and spacing between the disk 66 and the pulley 5, and the elastic member 64 and the attenuation member 68 may be formed to reduce the noise and vibration due to the collision when the disk 66 contacts the pulley 5, the noise and vibration transferred to the elastic member 64 from the disk 66 while the disk 66 contacts the pulley 5, and the noise and vibration due to collision when the disk 66 is spaced apart from the pulley 5.

More specifically, the elastic member 64 may include a first annular part 642 formed in an annular shape concentric with the hub 62 and fastened to the hub 62, a second annular part 644 formed in an annular shape for receiving the first annular part 642 and fastened to the disk 66, a bridge part 646 for connecting the first annular part 642 and the second annular part 644, and a protrusion part 648 protruded from the first annular part 642 to the second annular part 644 side.

The first annular part 642 may be formed to cover a spacing space between the hub 62 and the disk 66. That is, the outer diameter of the first annular part 642 is formed to be larger than the inner diameter of the disk 66, and the spacing space between the hub 62 and the disk 66 may be formed within a range of the first annular part 642.

Further, the first annular part 642 may be formed with a first annular part side fastening hole 642a into which the first fastening member 63 is inserted, the first annular part side fastening hole 642a may be formed by three so as to face the hub side fastening hole 624a, and the three first annular part side fastening holes 642a may be arranged at regular intervals along the rotational direction.

The second annular part 644 may be formed to cover the outer circumferential portion of the disk 66.

Further, the second annular part 644 may be formed with a second annular part side fastening hole 644a into which the second fastening member 65 is inserted, the second annular part side fastening hole 644a may be formed by three so as to face the disk side fastening hole 66a, and the three second annular part side fastening holes 644a may be arranged at regular intervals along the rotational direction.

At this time, in the elastic member 64, when a portion where the first annular part side fastening hole 642a is formed to be fastened to the hub 62 is referred to as a first fastening part P11, and a portion where the second fastening part side fastening hole 644a is formed to be fastened to the disk 66 is referred to as a second fastening part P21, the first fastening part P11 and the second fastening part P21 may be formed by three, respectively, and the three first fastening parts P11 and the three the second fastening parts P21 may be formed not to overlap each other in the rotational radius direction. That is, the three first fastening parts P11 may be arranged at regular intervals along the rotational direction, the three second fastening parts P21 may be arranged at regular intervals along the rotational direction, a portion (hereinafter referred to as a first intermediate part) P12 between any first fastening part P11 among the three first fastening parts P11 and the first fastening part P11 adjacent to the any first fastening part P11 may be formed to overlap one second fastening part P21 among the three second fastening parts P21 in the rotational radius direction, and a portion (hereinafter referred to as a second intermediate part) P22 between any second fastening part P21 among the three second fastening parts P21 and the second fastening part P21 adjacent to the any second fastening part P21 may be formed to overlap one first fastening part P11 among the three first fastening parts P11 in the rotational radius direction.

The bridge part 646 is formed by three, and any bridge part 646 among the three bridge parts 646 may be formed to overlap one first fastening part P11 among the three first fastening parts P11 and one second intermediate part P22 among the three second intermediate parts P22 in the rotational radius direction. That is, each of the bridge parts 646 may be formed to extend from each of the first fastening parts P11 to each of the second intermediate parts P22 in the rotational radius direction.

The protrusion part 648 is formed by three, and any protrusion part 648 among the three protrusion parts 648 may be formed to overlap one second fastening part P21 among the three second fastening parts P21 and one first intermediate part P12 among the three first intermediate parts P12 in the rotational radius direction. That is, each of the protrusion parts 648 may be formed to extend from each of the first intermediate parts P12 to each of the second fastening parts P21 side in the rotational radius direction. At this time, each of the protrusion parts 648 may not be extended to each of the second fastening parts P21 and may be formed to be extended only to a position facing the inner circumferential portion of the disk 66.

Further, the protrusion part 648 may be formed with a rigidity adjusting hole 648a penetrating the protrusion part 648 in order to adjust the rigidity (elasticity) of the protrusion part 648. That is, the protrusion part 648 is deformed and restored as described later, and when the rigidity of the protrusion part 648 is larger than a predetermined level, the protrusion part 648 is not easily deformed, and the protrusion part 648 may excessively squeeze the first attenuation member 682 described later. On the other hand, when the rigidity of the protrusion part 648 is smaller than the predetermined level, the protrusion part 648 may be deformed too easily or permanently deformed, the protrusion part 648 may be difficult to be restored, and the protrusion part 648 may not properly squeeze the first attenuation member 682 described later. Considering the above, the present embodiment includes the rigidity adjusting hole 648a, and when the rigidity of the protrusion part 648 is larger than a predetermined level, the size of the rigidity adjusting hole 648a may be increased to reduce the width of the protrusion part 648, thereby adjusting the rigidity of the protrusion part 648 to the predetermined level. Further, when the rigidity of the protrusion part 648 is smaller than the predetermined level, the size of the rigidity adjusting hole 648a may be reduced to increase the width of the protrusion part 648, thereby adjusting the rigidity of the protrusion part 648 to the predetermined level.

Here, in order to form the rigidity adjusting hole 648a and to easily adjust the size thereof, the protrusion part 648 may be formed in a substantially triangular shape that has one vertex directing the inner circumferential portion of the disk 66 and has a bottom side facing the vertex directing the first annular part 642, and formed at the central portion of the protrusion part 648 of the triangular shape.

The attenuation member 68 may include the first attenuation member 682 that contacts the elastic member 64 and the disk 66 not only during a period in which power to the field coil assembly 7 is interrupted, such that the disk 66 and the pulley 5 are spaced apart from each other (hereinafter referred to as a spacing period), but also a period in which power is applied to the field coil assembly 7, such that the disk 66 and the pulley 5 contact each other (hereinafter referred to as a contact period).

The first attenuation member 682 may include a first coupling part 682a coupled with the protrusion part 648 and a first damping part 682b extending from the first coupling part 682a to the disk 66 side, interposed between the protrusion part 648 and the disk 66, and capable of contacting the disk 66.

Here, the protrusion part 648 and the first attenuation member 682 may be formed so that the first damping part 682b always (during the spacing period and the contact period) contacts the disk 66 and the first damping part 682b is always (during the spacing period and the contact period) squeezed between the protrusion part 648 and the disk 66.

That is, when the thickness of the first damping part 682b is referred to as a first dimension in a state where the first attenuation member 682 has been detached from between the protrusion part 648 and the disk 66, an interval between the protrusion part 648 and the disk 66 in a state where the first attenuation member 682 has been detached from between the protrusion part 648 and the disk 66 and the disk 66 has been spaced apart from the pulley 5 is referred to as a second dimension, and an interval between the protrusion part 648 and the disk 66 in a state where the first damping part 682b has been detached from between the protrusion part 648 and the disk 66 and the disk 66 has contacted the pulley 5 is referred to as a third dimension, the first dimension may be formed to be larger than the second dimension and the third dimension. At this time, the thickness and the interval are measured in the direction of the rotary shaft 3.

Further, the attenuation member 68 may further include the second attenuation member 684 that contacts the elastic member 64 and the disk 66 during the spacing period but is spaced apart from one of the elastic member 64 and the disks 66 during the contact period.

The second attenuation member 684 may include a second coupling part 684a coupled with the bridge part 646 and a second damping part 684b extending from the second coupling part 684a to the disk 66 side, interposed between the bridge part 646 and the disk 66, interposed between the second intermediate part P22 and the disk 66, and capable of contacting the disk 66.

Here, the bridge part 646, the second intermediate part P22, and the second attenuation member 684 may be formed so that the second damping part 684b contacts the disk 66 during the spacing period, and the second damping part 684b is squeezed between the bridge part 646 and the disk 66 and between the second intermediate part P22 and the disk 66 during the spacing period.

That is, when the thickness of the second damping part 684b in a state where the second attenuation member 684 has been detached from between the elastic member 64 (more accurately, the bridge part 646 and the second intermediate part P22) and the disk 66 is referred to as a fourth dimension, an interval between the elastic member 64 (more accurately, the bridge part 646 and the second intermediate part P22) and the disk 66 in a state where the second attenuation member 684 has been detached from between the elastic member 64 (more accurately, the bridge part 646 and the second intermediate part P22) and the disk 66 and the disk 66 has been spaced apart from the pulley 5 is referred to as a fifth dimension, and an interval between the elastic member 64 (more accurately, the bridge part 646 and the second intermediate part P22) and the disk 66 in a state where the second damping part 684b has been detached from between the elastic member 64 (more accurately, the bridge part 646 and the second intermediate part P22) and the disk 66 and the disk 66 has contacted the pulley 5 is referred to as a sixth dimension, the fourth dimension may be formed to be larger than the fifth dimension and smaller than the sixth dimension.

The field coil assembly 7 may include a coil housing and a coil received in the coil housing and for generating an electromagnetic force when power is applied.

The compressor according to the present embodiment according to this configuration may be operated as follows.

That is, the pulley 5 may be rotated by receiving a driving force from the driving source (not shown).

In this state, when power is applied to the coil, the disk 66 may be moved to the pulley 5 side by the attractive force by the magnetic induction of the coil to contact the pulley 5. That is, the disk 66 and the pulley 5 are coupled so that the power of the driving source (not shown) may be transferred to the pulley 5, the disk 66, the elastic member 64, and the hub 62. Further, the rotary shaft 3 may compress the refrigerant by operating the compression mechanism 2 with the received power.

On the other hand, when the power to the coil is interrupted, the attractive force by the magnetic induction of the coil is not generated at all, and the disk 66 may be moved by the elastic force of the elastic member 64 in the direction away from the pulley 5 to be spaced apart from the pulley 5. That is, the power transfer from the driving source (not shown) to the rotary shaft 3 may be interrupted. Further, the compression mechanism 2 may be interrupted, and the compression of the refrigerant may be interrupted.

Here, the clutch 4 and the compressor including the same according to the present embodiment may include the elastic member 64 and the attenuation member 68, thereby reducing the noise and vibration due to the contact and spacing between the disk 66 and the pulley 5.

Specifically, the clutch 4 and the compressor including the same according to the present embodiment may include the protrusion part 648 and the first attenuation member 682, and the first attenuation member 682 (more accurately, the first damping part 682b) may be formed to always (during the contact period and the spacing period) contact the protrusion part 648 and the disk 66, such that the noise and vibration due to the contact and spacing between the disk 66 and the pulley 5 may be reduced from being transferred to the elastic member 64.

That is, the first attenuation member 682 may contact the protrusion part 648 and the disk 66 at the time point when the disk 66 and the pulley 5 contact (hereinafter referred to as a contact time point) after power is applied to the field coil assembly 7, thereby absorbing the noise and vibration due to the collision between the disk 66 and the pulley 5. Accordingly, the noise and vibration due to the collision between the disk 66 and the pulley 5 may be reduced from being transferred to the elastic member 64 at the contact time point.

Further, the first attenuation member 682 may contact the protrusion part 648 and the disk 66 during the contact period, thereby absorbing the noise and vibration transferred to the elastic member 64 from the pulley 5 through the disk 66. Accordingly, the noise and vibration transferred from the pulley 5 through the disk 66 may be reduced from being transferred to the elastic member 64 during the contact period.

Further, the first attenuation member 682 may contact the protrusion part 648 and the disk 66 at the time point when the disk 66 is spaced apart from the pulley 5 (hereinafter referred to as a spacing time point) while power applied to the field coil assembly 7 is interrupted, thereby preventing the collision between the disk 66 and the elastic member 64, and mitigating the collision transferred to the elastic member 64 by the repulsive force of the disk 66. Accordingly, the noise and vibration due to the collision between the disk 66 and the elastic member 64 may be reduced from being transferred to the elastic member 64 at the spacing time point.

Further, the clutch 4 and the compressor including the same according to the present embodiment may further include the second attenuation member 684, thereby further reducing the noise and vibration due to the collision between the disk 66 and the pulley 5 at the contact time point, and further reducing the noise and vibration due to the collision between the elastic member 64 and the disk 66 at the spacing time point.

That is, the second attenuation member 684 is configured so that the contact surface (S2) between the elastic member 64 and the disk 66 and the contact surface (S1) between the elastic member 64 and the hub 62 are disposed on the planes differently from each other due to the thickness of the second attenuation member 684 (more accurately, the second damping part 684b) while contacting the elastic member 64 (more accurately, the bridge part 646 and the second intermediate part P22) and the disk 66 during the spacing period. At this time, the second attenuation member 684 may be formed on the elastic member 64, particularly, the bridge part 646 and the second intermediate part P22, thereby spacing the contact surface (S2) between the elastic member 64 and the disk 66 from a position such as the contact surface (S1) between the elastic member 64 and the hub 62 to the pulley 5 side. That is, the second attenuation member 684 may give the initial bending deformation to the elastic member 64 during the spacing period. The second attenuation member 684 may increase the elastic force (a force operated in the direction where the disk 66 is away from the pulley 5) applied by the elastic member 64 to the disk 66 during the contact period including the contact time point, thereby reducing the amount of collision between the disk 66 and the pulley 5 at the contact time point. Accordingly, the noise and vibration generated by the collision between the disk 66 and the pulley 5 may be more effectively reduced from being transferred to the elastic member 64 at the contact time point.

Further, the second attenuation member 684 may be spaced apart from the disk 66 during the contact period and may contact the disk 66 again during the spacing period, thereby preventing the collision between the disk 66 and the elastic member 64 more effectively, and mitigating the collision transferred to the elastic member 64 by the repulsive force of the disk 66 more effectively. Accordingly, the noise and vibration due to the collision between the elastic member 64 and the disk 66 may be more effectively reduced from being transferred to the elastic member 64 at the spacing time point.

Meanwhile, the second attenuation member 684 may enhance the responsiveness of the clutch 4. That is, an increase in the elastic force of the elastic member 64 by the second attenuation member 684 may cause the disk 66 to be spaced apart from the pulley 5 at a faster speed at the time point changed from the contact period to the spacing period, thereby further enhancing the responsiveness of the clutch 4.

Meanwhile, in the present embodiment, the first attenuation member 682 is coupled with the protrusion part 648, and the protrusion part 648 is formed to press the first attenuation member 682 to the disk 66 side so that the first attenuation member 682 always (the contact period and the spacing period) contacts the disk 66. However, the present disclosure is not limited thereto. That is, although not shown separately, the first attenuation member 682 may be coupled with the disk 66, and the protrusion part 648 may also be formed to press the first attenuation member 682 so that the first attenuation member 682 always (the contact period and the spacing period) contacts the protrusion part 648.

Figure 12:
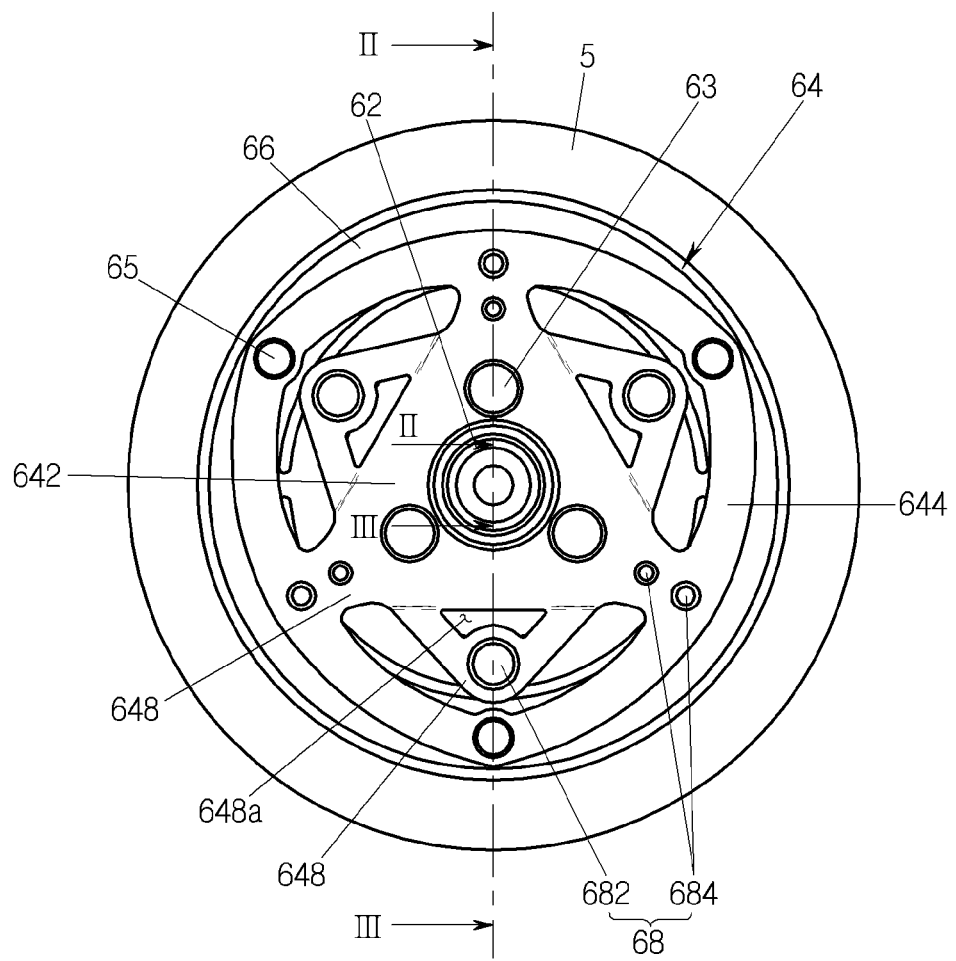
FIG. 12 is a plane diagram showing a clutch according to another embodiment of the present disclosure.
Figure 13:
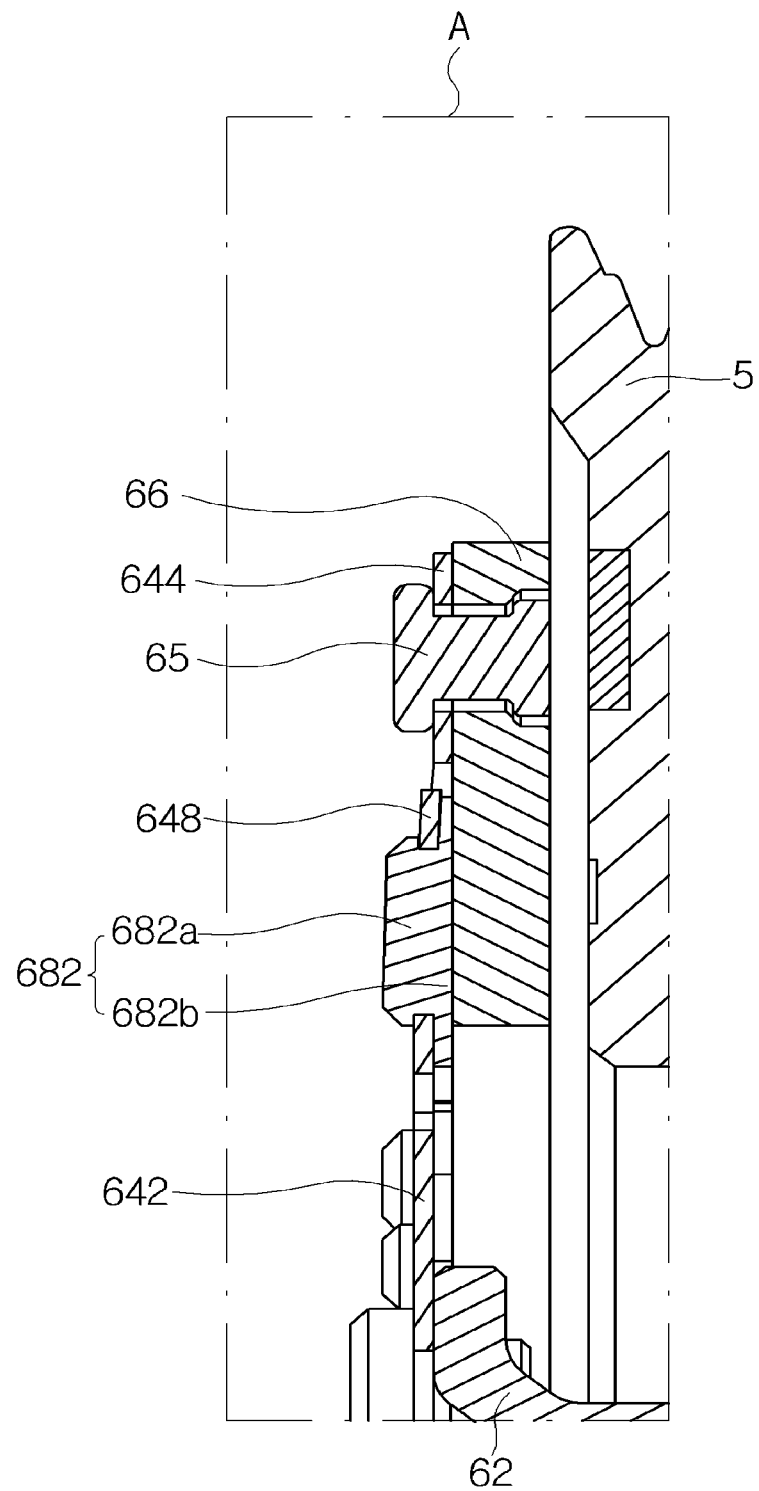
FIG. 13 is a cross-sectional diagram of the line II-II of FIG. 12 in a state where the disk and the pulley have been spaced apart from each other.
Figure 14:
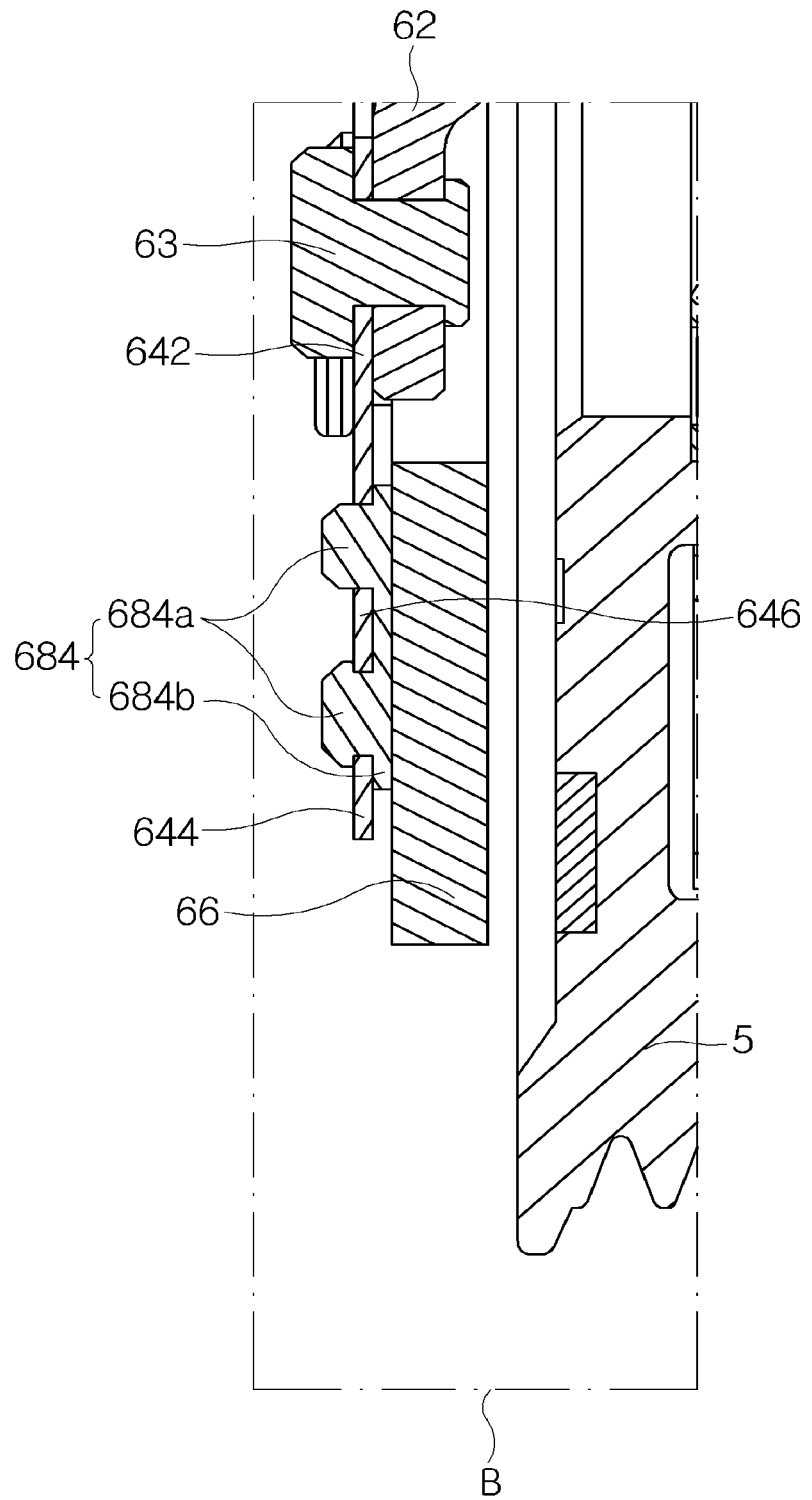
FIG. 14 is a cross-sectional diagram of the line III-III of FIG. 12 in a state where the disk and the pulley have been spaced apart from each other.
Figure 15:
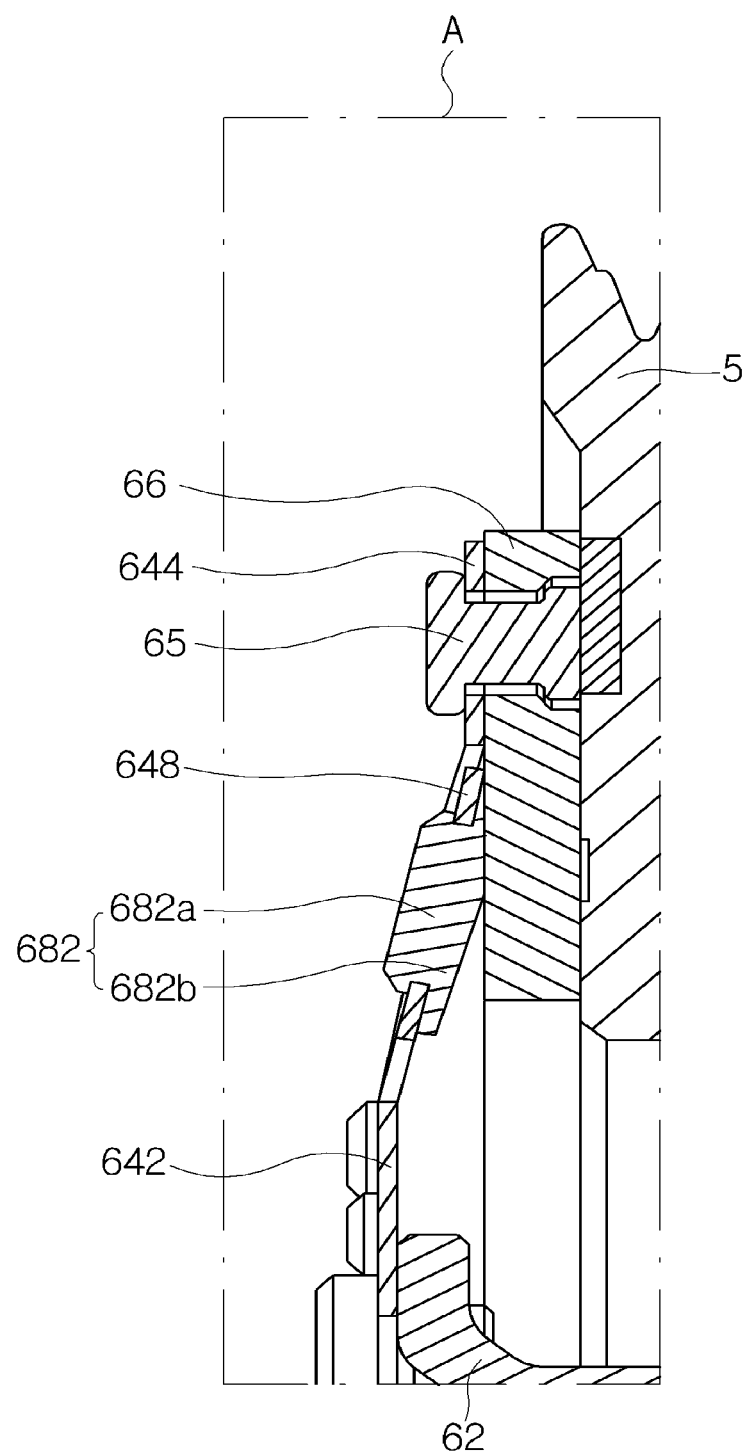
FIG. 15 is a cross-sectional diagram of the line II-II of FIG. 12 in a state where the disk and the pulley have been contacted.
Figure 16:
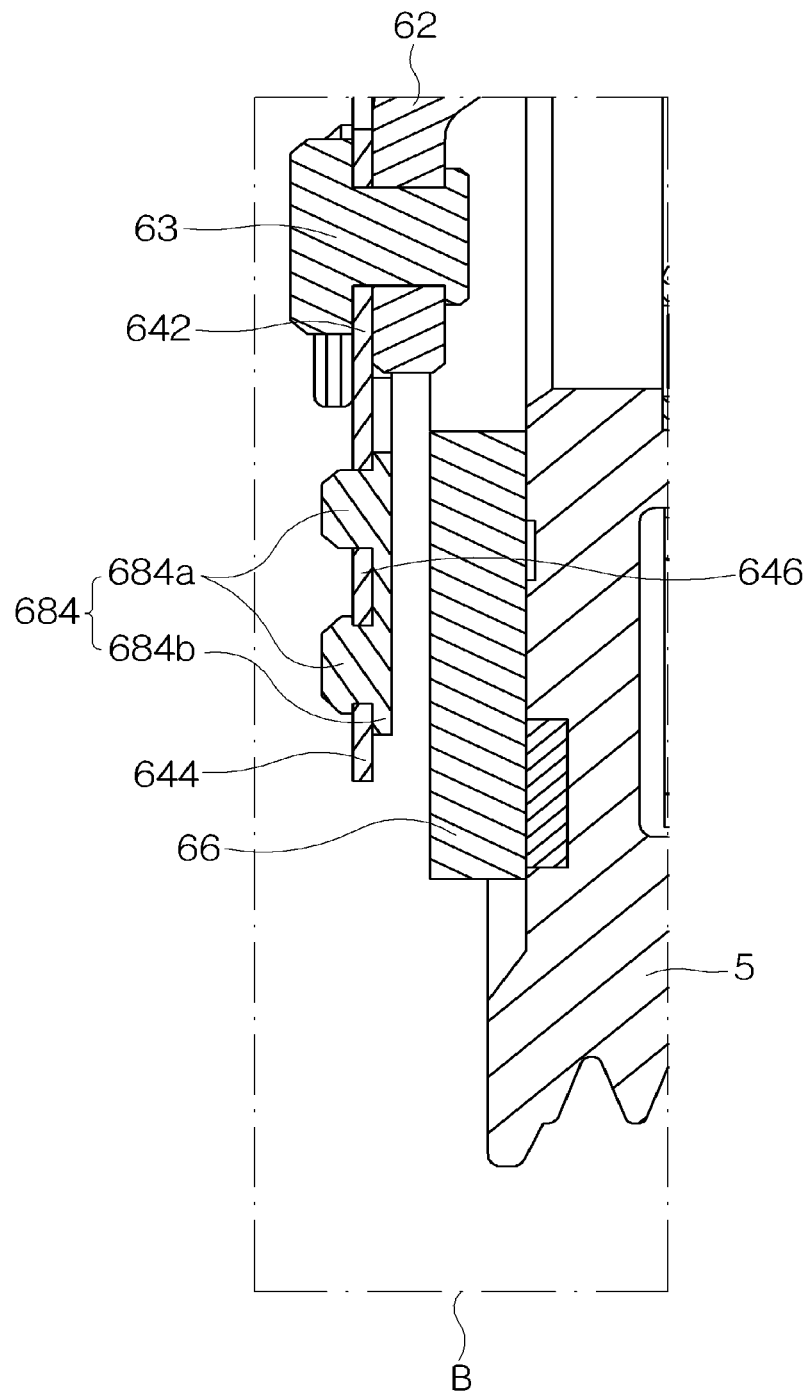
FIG. 16 is a cross-sectional diagram of the line III-III of FIG. 12 in a state where the disk and the pulley have been contacted.
Figure 17:
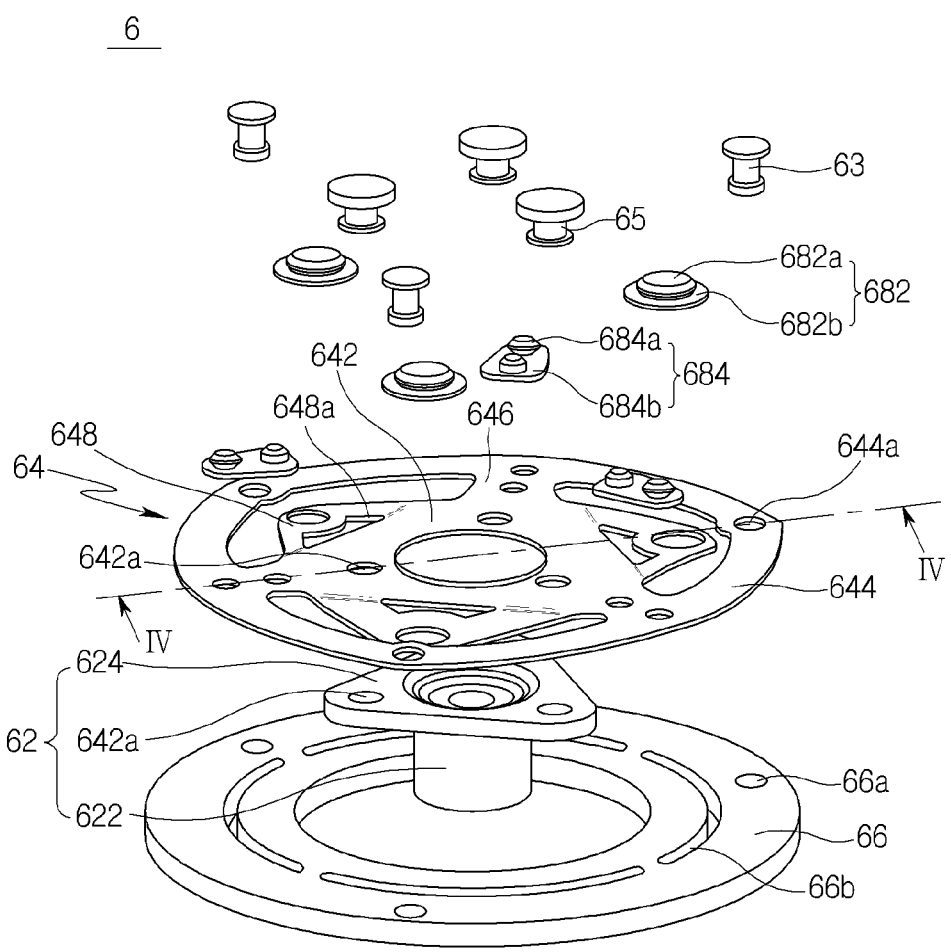
FIG. 17 is an exploded perspective diagram showing a disk hub assembly in the clutch of FIG. 12.
Figure 18:
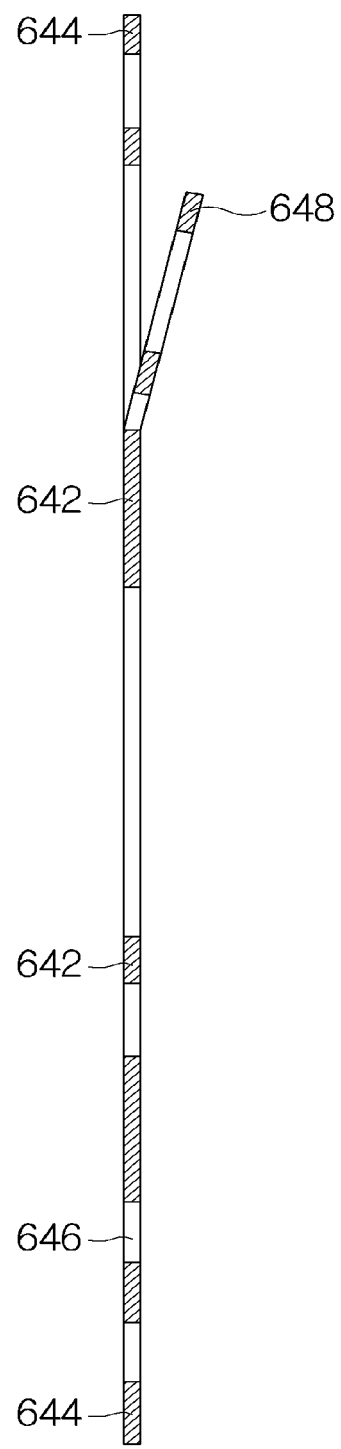
FIG. 18 is a cross-sectional diagram of the line IV-IV of FIG. 17, and a cross-sectional diagram showing an elastic member in a state having been detached from the disk hub assembly.

In the present embodiment, the first attenuation member 682 always contacts the protrusion part 648 and the disk 66, and in order to save the manufacturing cost, as shown in FIG. 3, the protrusion part 648 is formed to be disposed on the same plane as the first annular part 642 (hereinafter referred to as a reference surface) when no external force is applied to the protrusion part 648. Further, as shown in FIG. 8, the protrusion part 648 is formed to be deformed to the opposite side of the disk 66 based on the reference surface the disk 66 spaced apart from the pulley 5 during the spacing period and the first attenuation member 682 supported to the disk 66. Further, as shown in FIG. 10, the protrusion part 648 is formed to be restored to the reference surface side by the disk 66 moved to the pulley 5 side during the contact period and the first attenuation member 682 moved to the pulley 5 side together with the disk 66. However, the present disclosure is not limited thereto, and may also be formed as shown in FIGS. 12 to 18. As shown in FIGS. 12, 17, and 18, the protrusion part 648 may be formed to be bent to the disk 66 side based on the reference surface when no external force is applied to the protrusion part 648. Further, as shown in FIG. 13, the protrusion part 648 may be formed to be deformed in the direction where the bending amount of the protrusion part 648 is reduced by the disk 66 spaced apart from the pulley 5 during the spacing period and the first attenuation member 682 supported to the disk 66. Further, as shown in FIG. 15, the protrusion part 648 may be formed to be restored in the direction where the bending amount is increased by the disk 66 moved to the pulley 5 side during the contact period and the first attenuation member 682 moved to the pulley 5 side together with the disk 66. In this case, the manufacturing cost is increased as the protrusion part 648 is bent, but the first attenuation member 682 may be more effectively squeezed to the protrusion part 648 and the disk 66.

Meanwhile, in the present embodiment, the protrusion part 648 is formed in a substantially triangular shape, and the rigidity adjusting hole 648*a* is formed at the central portion of the protrusion part 648 of the triangular shape. However, the present disclosure is not limited thereto. That is, although not shown separately, if the protrusion part 648 is a cantilever type protruded from the first annular part 642 to a position facing the inner circumferential portion of the disk 66, there is no restriction on the shape of the protrusion part 648, and the rigidity adjusting hole 648*a* may also be engraved from the outer circumferential surface of the protrusion part 648.

Meanwhile, in the present embodiment, the second attenuation member 684 may be coupled to the bridge part 646 and the second intermediate part P22 and formed to contact and be spaced apart from the disk 66. However, the present disclosure is not limited thereto. That is, although not shown separately, the second attenuation member 684 may be coupled with the disk 66 and also formed to contact and be spaced apart from the bridge part 646 and the second intermediate part P22.

Meanwhile, in the present embodiment, the second attenuation member 684 is formed to be interposed between the bridge part 646 and the disk 66 and between the second intermediate part P22 and the disk 66. However, the present disclosure is not limited thereto. That is, although not shown separately, the second attenuation member 684 may be formed to be interposed only between the bridge part 646 and the disk 66. Alternatively, the second attenuation member 684 may also be formed to be interposed only between the second intermediate part P22 and the disk 66.

Figure 19:
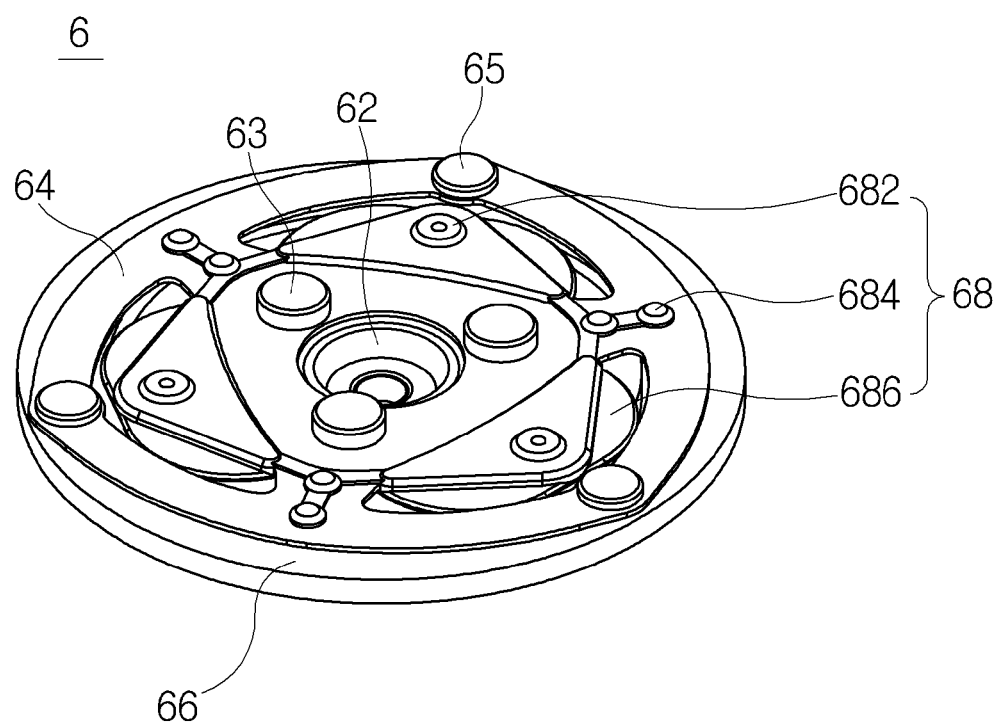
FIG. 19 is a perspective diagram showing a disk hub assembly in a clutch according to still another embodiment of the present disclosure.
Figure 20:
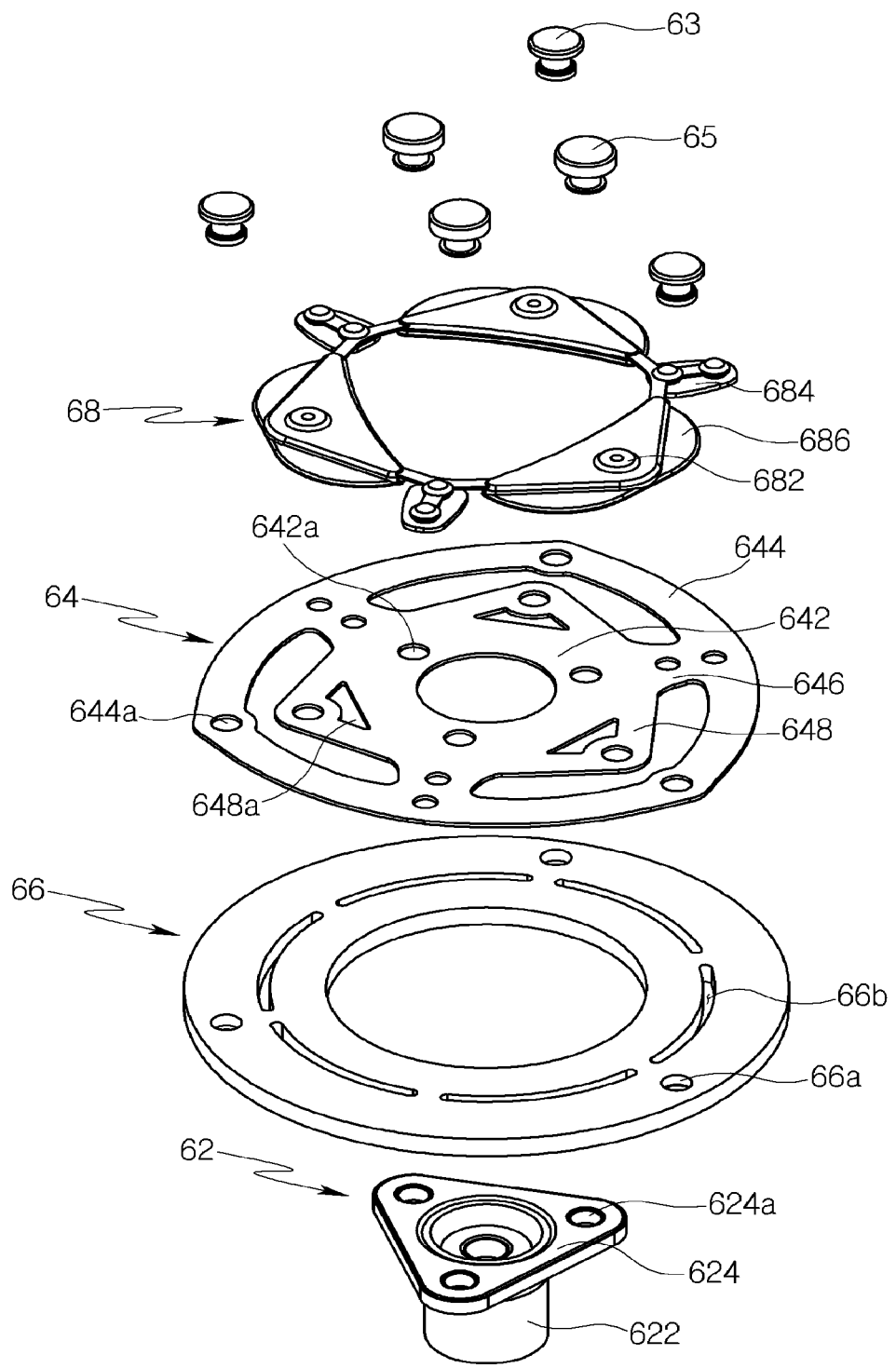
FIG. 20 is an exploded perspective diagram of FIG. 19.

Meanwhile, in the present embodiment, the first attenuation member 682 and the second attenuation member 684 are formed separately from each other, and are separately assembled to the elastic member 64, respectively. However, the present disclosure is not limited thereto, and as shown in FIGS. 19 and 20, the attenuation member 68 may be integrally formed. That is, the first attenuation member 682 and the second attenuation member 684 may be integrally formed with each other. At this time, the integrated attenuation member 68 may be coupled with the elastic member 64 by the molding method. In this case, the manufacturing cost consumed for forming the attenuation member 68 may be saved.

Meanwhile, as shown in FIGS. 19 and 20, the attenuation member 68 may further include a blind 686 for covering the spacing space between the hub 62 and the disk 66 and at least a portion of a slot 66*b* of the disk 66. In this case, foreign substances may be prevented from flowing through the spacing space between the hub 62 and the disk 66 and the slot 66*b* of the disk 66. Here, in an embodiment shown in FIGS. 19 and 20, as the blind 686 is formed integrally with the second attenuation member 684, the first attenuation member 682, the second attenuation member 684, and the blind 686 are integrally formed, but when the first attenuation member 682 and the second attenuation member 684 are formed separately from each other, the blind 686 may be integrally formed with any one of the first attenuation member 682 and the second attenuation member 684.

Meanwhile, in the present embodiment, the attenuation member 68 is, for example, made of acrylonitrile-butadiene rubber (NBR), Isobutylene-Isoprene rubber (IIR), ethylene propylene diene monomer rubber (EPDM), thermoplastic resin, and thermosetting plastic, but a material of elastic member 64 may be appropriately changed.

Meanwhile, in the present embodiment, the elastic member 64 is formed of, for example, SUS or steel, but the material of the elastic member 64 may be appropriately changed.

Meanwhile, in the present embodiment, the disk 66 and the pulley 5 contact when the field coil assembly 7 is magnetized, and the disk 66 and the pulley 5 are formed to be spaced apart from each other when the field coil assembly 7 is demagnetized. That is, the field coil assembly 7 is magnetized when power is applied to move the disk 66 to the pulley 5 side to contact the disk 66 and the pulley 5, the elastic member 64 is formed to apply the elastic force to the disk 66 in the direction where the disk 66 is away from the pulley 5. However, the present disclosure is not limited thereto, and the disk 66 and the pulley 5 may be formed to be spaced apart from each other when the field coil assembly 7 is magnetized, and the disk 66 and the pulley 5 may be formed contact when the field coil assembly 7 is demagnetized. That is, the field coil assembly 7 is magnetized when power is applied to move the disk 66 in the direction away from the pulley 5 to space the disk 66 apart from the pulley 5, and elastic member 64 may be formed to apply the elastic force to the disk 66 in the direction where the disk 66 approaches the pulley 5.

INDUSTRIAL APPLICABILITY

The present disclosure provides a clutch capable of reducing noise and vibration due to contact and spacing between a pulley and a disk, and a compressor including the same.

What is claimed:
1. A clutch, comprising:
a hub fastened to a rotary shaft of a compressor and rotatable with the rotary shaft in a state where its position has been fixed;
a disk fastened to the hub and rotatable with the hub;
a pulley rotated by receiving power from a driving source of the compressor;
an elastic member fastening the hub and the disk, and fastening the hub and the disk so that the disk approaches or is away from the pulley based on the hub;
a field coil assembly magnetized when power is applied to contact or space the disk and the pulley; and
an attenuation member interposed between the elastic member and the disk,
wherein the attenuation member comprises a first attenuation member contacting the disk and the elastic member during a contact period and a spacing period between the disk and the pulley, and a second attenuation member contacting the disk and the elastic member during a spacing period between the disk and the pulley, and spaced apart from one of the disk and the elastic member during a contact period between the disk and the pulley, and
wherein the second attenuation member spaces a contact surface between the elastic member and the disk during the spacing period between the disk and the pulley from a position such as a contact surface between the elastic member and the hub to the pulley side.
2. The clutch of claim 1, wherein the elastic member comprises a first annular part fastened to the hub;
a second annular part formed of an annular shape receiving the first annular part, and fastened to the disk; and
a protrusion part protruded from the first annular part to the second annular part side,
wherein the first attenuation member is interposed between the protrusion part and the disk.
3. The clutch of claim 2, wherein the protrusion part and the first attenuation member are formed so that the first attenuation member is squeezed between the protrusion part and the disk.
4. The clutch of claim 3, wherein the first attenuation member is fixed to the protrusion part, and wherein the protrusion part is formed to press the first attenuation member to the disk side.
5. The clutch of claim 3, wherein the first attenuation member is fixed to the disk, and
wherein the protrusion part is formed to press the first attenuation member.
6. The clutch of claim 2, wherein the protrusion part is formed with a rigidity adjusting hole penetrating the protrusion part in order to adjust the rigidity of the protrusion part.
7. The clutch of claim 1, wherein the elastic member comprises a first annular part fastened to the hub;
a second annular part formed of an annular shape receiving the first annular part, and fastened to the disk; and
a bridge part for connecting the first annular part with the second annular part,
wherein the second attenuation member is interposed between at least one of the bridge part and the second annular part and the disk.
8. The clutch of claim 7, wherein the first annular part comprises
a plurality of first fastening parts disposed at regular intervals along the rotational direction and fastened to the hub, respectively; and
a plurality of first intermediate parts interposed between the plurality of first fastening parts,
wherein the second annular part comprises
a plurality of second fastening parts disposed at regular intervals along the rotational direction and fastened to the disk, respectively; and
a plurality of second intermediate parts interposed between the plurality of second fastening parts,
wherein a plurality of bridge parts are formed,
wherein each of the first intermediate parts is formed to overlap each of the second fastening parts in the rotational radius direction,
wherein each of the first fastening parts is formed to overlap each of the second intermediate parts in the rotational radius direction,
wherein each of the bridge parts is formed to be extended in the rotational radius direction from each of the first fastening parts to each of the second intermediate parts, and
wherein the second attenuation member is interposed between at least one of the bridge part and the second intermediate part and the disk.
9. The clutch of claim 1, wherein the first attenuation member and the second attenuation member are integrally formed.
10. A compressor, comprising:
a casing;
a compression mechanism provided inside the casing and for compressing refrigerant;
a rotary shaft for transferring a rotational force from a driving source provided outside the casing to the compression mechanism; and
a power transfer mechanism for selectively connecting and disconnecting the driving source and the rotary shaft,
wherein the power transfer mechanism is formed of the clutch of claim 1.
11. A clutch, comprising:
a hub fastened to a rotary shaft of a compressor and rotatable with the rotary shaft in a state where its position has been fixed;
a disk fastened to the hub and rotatable with the hub;

a pulley rotated by receiving power from a driving source of the compressor;

an elastic member fastening the hub and the disk, and fastening the hub and the disk so that the disk approaches or is away from the pulley based on the hub;

a field coil assembly magnetized when power is applied to contact or space the disk and the pulley; and an attenuation member interposed between the elastic member and the disk, wherein the attenuation member comprises a first attenuation member contacting the disk and the elastic member during a contact period and a spacing period between the disk and the pulley, wherein the elastic member comprises a first annular part fastened to the hub; a second annular part formed of an annular shape receiving the first annular part, and fastened to the disk; and a protrusion part protruded from the first annular part to the second annular part side, wherein the first attenuation member is interposed between the protrusion part and the disk, wherein the first annular part comprises a plurality of first fastening parts disposed at regular intervals along the rotational direction and fastened to the hub, respectively; and a plurality of first intermediate parts interposed between the plurality of first fastening parts, wherein the second annular part comprises a plurality of second fastening parts disposed at regular intervals along the rotational direction and fastened to the disk, respectively; and a plurality of second intermediate parts interposed between the plurality of second fastening parts, wherein a plurality of protrusion parts are formed, wherein each of the first intermediate parts is formed to overlap each of the second fastening parts in the rotational radius direction, wherein each of the first fastening parts is formed to overlap each of the second intermediate parts in the rotational radius direction, and wherein each of the protrusion parts is formed to be protruded in the rotational radius direction from each of the first intermediate parts to a position facing the inner circumferential portion of the disk.

12. A compressor, comprising:

a casing;

a compression mechanism provided inside the casing and for compressing refrigerant;

a rotary shaft for transferring a rotational force from a driving source provided outside the casing to the compression mechanism; and a power transfer mechanism for selectively connecting and disconnecting the driving source and the rotary shaft, wherein the power transfer mechanism is formed of the clutch of claim 4.

13. A clutch, comprising:

a hub fastened to a rotary shaft of a compressor and rotatable with the rotary shaft in a state where its position has been fixed;

a disk fastened to the hub and rotatable with the hub;

a pulley rotated by receiving power from a driving source of the compressor;

an elastic member fastening the hub and the disk, and fastening the hub and the disk so that the disk approaches or is away from the pulley based on the hub;

a field coil assembly magnetized when power is applied to contact or space the disk and the pulley; and an attenuation member interposed between the elastic member and the disk, wherein the attenuation member comprises a first attenuation member contacting the disk and the elastic member during a contact period and a spacing period between the disk and the pulley, wherein the elastic member comprises a first annular part fastened to the hub; a second annular part formed of an annular shape receiving the first annular part, and fastened to the disk; and a protrusion part protruded from the first annular part to the second annular part side, wherein the first attenuation member is interposed between the protrusion part and the disk, and wherein when the thickness of the first attenuation member in a state where the first attenuation member has been detached from the protrusion part and the disk is referred to as a first dimension, an interval between the protrusion part and the disk in a state where the first attenuation member has been detached from the protrusion part and the disk and the disk has been spaced apart from the pulley is referred to as a second dimension, and an interval between the protrusion part and the disk in a state where the first attenuation member has been detached from the protrusion part and the disk and the disk has contacted the pulley is referred to as a third dimension, the first dimension is formed to be larger than the second dimension and the third dimension.

14. The clutch of claim 13, wherein the protrusion part is formed to be disposed on the same plane as the first annular part when no external force is applied to the protrusion part.

15. The clutch of claim 14, wherein the protrusion part is deformed to the opposite side of the disk, when the first attenuation member is interposed between the protrusion part and the disk and the disk is spaced apart from the pulley, and is restored to the plane side, when the first attenuation member is interposed between the protrusion part and the disk and the disk contacts the pulley.

16. The clutch of claim 13, wherein the protrusion part is formed to be bent to the disk side based on the plane where the first annular part is disposed when no external force is applied to the protrusion part.

17. The clutch of claim 16, wherein the protrusion part is deformed in the direction where the bending amount is reduced, when the first attenuation member is interposed between the protrusion part and the disk and the disk is spaced apart from the pulley, and is restored in the direction where the bending amount is increased, when the first attenuation member is interposed between the protrusion part and the disk and the disk contacts the pulley.

18. A compressor, comprising:

a casing;

a compression mechanism provided inside the casing and for compressing refrigerant;

a rotary shaft for transferring a rotational force from a driving source provided outside the casing to the compression mechanism; and a power transfer mechanism for selectively connecting and disconnecting the driving source and the rotary shaft, wherein the power transfer mechanism is formed of the clutch of claim 8.

19. A clutch, comprising:

a hub fastened to a rotary shaft of a compressor and rotatable with the rotary shaft in a state where its position has been fixed;

a disk fastened to the hub and rotatable with the hub;

a pulley rotated by receiving power from a driving source of the compressor;

an elastic member fastening the hub and the disk, and fastening the hub and the disk so that the disk approaches or is away from the pulley based on the hub;

a field coil assembly magnetized when power is applied to contact or space the disk and the pulley; and an attenuation member interposed between the elastic member and the disk, and wherein the attenuation member comprises a first attenuation member contacting the disk and the elastic member during a contact period and a spacing period between the disk and the pulley;

a second attenuation member contacting the disk and the elastic member during the spacing period between the disk and the pulley; and a blind for covering the spacing space between the hub and the disk, and at least a portion of a slot of the disk.

20. The clutch of claim 19, wherein the blind is formed integrally with at least one of the first attenuation member and the second attenuation member.

21. A compressor, comprising:

a casing;

a compression mechanism provided inside the casing and for compressing refrigerant;

a rotary shaft for transferring a rotational force from a driving source provided outside the casing to the compression mechanism; and a power transfer mechanism for selectively connecting and disconnecting the driving source and the rotary shaft, wherein the power transfer mechanism is formed of the clutch of claim 18.

* * * * *